United States Patent
Bi et al.

(10) Patent No.: US 12,052,678 B2
(45) Date of Patent: Jul. 30, 2024

(54) TIMING INFORMATION CONFIGURATION METHOD, DEVICE AND SYSTEM, AND STORAGE MEDIUM

(71) Applicant: ZTE CORPORATION, Shenzhen (CN)

(72) Inventors: Feng Bi, Shenzhen (CN); Ting Miao, Shenzhen (CN); Wenfeng Zhang, Shenzhen (CN); Youxiong Lu, Shenzhen (CN); Weimin Xing, Shenzhen (CN); Wenhao Liu, Shenzhen (CN); Meng Mei, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 228 days.

(21) Appl. No.: 17/413,482

(22) PCT Filed: Dec. 11, 2019

(86) PCT No.: PCT/CN2019/124440
§ 371 (c)(1),
(2) Date: Jun. 11, 2021

(87) PCT Pub. No.: WO2020/119700
PCT Pub. Date: Jun. 18, 2020

(65) Prior Publication Data
US 2022/0070810 A1 Mar. 3, 2022

(30) Foreign Application Priority Data
Dec. 12, 2018 (CN) .......................... 201811518172.2

(51) Int. Cl.
*H04W 56/00* (2009.01)
(52) U.S. Cl.
CPC .............................. *H04W 56/0045* (2013.01)

(58) Field of Classification Search
None
See application file for complete search history.

(56) References Cited

U.S. PATENT DOCUMENTS

| 9,325,480 B2 | 4/2016 | Narasimha et al. |
| 2015/0085839 A1 | 3/2015 | Bergström et al. |

(Continued)

FOREIGN PATENT DOCUMENTS

| CN | 101267419 A | 9/2008 |
| CN | 101682897 A | 3/2010 |

(Continued)

OTHER PUBLICATIONS

Extended European Search Report in Application No. 19895686.4 dated Jul. 27, 2022, 8 pages.

(Continued)

*Primary Examiner* — Saad Khawar
(74) *Attorney, Agent, or Firm* — Morgan, Lewis & Bockius LLP

(57) ABSTRACT

Provided are a timing information configuration method, apparatus and system and a storage medium. The timing information configuration method includes that a first node predefines or configures timing information of a second node. The timing information includes at least one of: a timing mode, a downlink transmission timing alignment mode, a timing advance (TA) configuration mode, a TA value, an offset of a TA value, a number of orthogonal frequency division multiplexing (OFDM) symbols that an uplink transmission timing is advanced or delayed relative to a downlink transmission timing for alignment, or a number of OFDM symbols that an uplink reception timing is advanced or delayed relative to a downlink reception timing for alignment. The timing information configuration method includes that a second node determines timing information (Continued)

of the second node in a manner of predefinition or in a manner of being configured.

7 Claims, 7 Drawing Sheets

(56) References Cited

U.S. PATENT DOCUMENTS

| | | | |
|---|---|---|---|
| 2017/0288845 | A1 | 10/2017 | Axmon et al. |
| 2019/0229880 | A1* | 7/2019 | Lin .................. H04L 27/26025 |
| 2020/0044796 | A1 | 2/2020 | Yang et al. |
| 2020/0145952 | A1* | 5/2020 | Keskitalo ............ H04W 56/007 |
| 2021/0014023 | A1* | 1/2021 | Zheng .................. H04L 5/0044 |
| 2021/0345279 | A1* | 11/2021 | Ying ................. H04W 56/0055 |

FOREIGN PATENT DOCUMENTS

| | | |
|---|---|---|
| CN | 102143586 A | 8/2011 |
| CN | 103843438 A | 6/2014 |
| CN | 107872417 A | 4/2018 |
| CN | 108289325 A | 7/2018 |
| CN | 108293236 A | 7/2018 |
| CN | 110535677 A | 12/2019 |
| EP | 3522469 A1 | 8/2019 |
| KR | 20170093785 A | 8/2017 |
| WO | WO2016138664 A1 | 9/2016 |
| WO | WO-2017219287 A1 | 12/2017 |
| WO | WO2018/059481 A1 | 4/2018 |
| WO | WO2018/127208 A1 | 7/2018 |
| WO | WO-2018212526 A1 | 11/2018 |

OTHER PUBLICATIONS

International Search Report for Application No. PCT/CN2019/124440, dated Mar. 6, 2020, 4 pages including translation.
Cewit, "On IAB timing alignment", 3GPP TSG RAN WG1 Meeting #94bis, R1-1811554, Chengdu, China, Oct. 8-12, 2018, 7 pages.
Chinese Office Action for Application No. 201811518172.2, dated Mar. 30, 2022, 22 pages including translation.
Chinese Search Report for Application No. 201811518172.2, dated Mar. 22, 2022, 5 pages including translation.
Chinse Office Action in Application No. 201811518172.2 dated Nov. 1, 2022, 22 pages including translation.
Chinse Supplemental Search Report in Application No. 201811518172.2 dated Oct. 24, 2022, 4 pages including translation.
Office Action in Indonesian Application No. P00202105284 dated May 17, 2023, 6 pages including translation.

* cited by examiner

A first node predefines or configures timing information of a second node; where the timing information includes at least one of: a timing mode, a reference timing alignment mode, a TA configuration mode, a TA value, an offset of a TA value, a number of OFDM symbols that an uplink transmission link is advanced or delayed relative to a downlink transmission link for alignment, or a number of OFDM symbols that an uplink reception link is advanced or delayed relative to a downlink reception link for alignment

A second node determines timing information in a manner of predefinition or in a manner of configuration; where the timing information includes at least one of: a timing mode, a reference timing alignment mode, a TA configuration mode, a TA value, an offset of a TA value, a number of OFDM symbols that an uplink transmission link is advanced or delayed relative to a downlink transmission link for alignment, or a number of OFDM symbols that an uplink reception link is advanced or delayed relative to a downlink reception link for alignment

FIG. 3

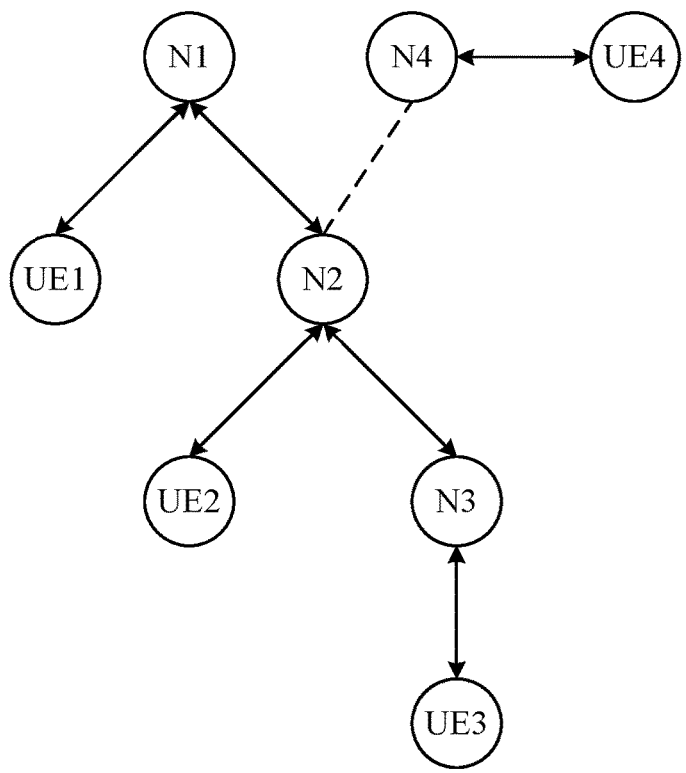

FIG. 4

TIMING INFORMATION CONFIGURATION METHOD, DEVICE AND SYSTEM, AND STORAGE MEDIUM

CROSS REFERENCE TO RELATED APPLICATIONS

This is a national stage application filed under 37 U.S.C. 371 based on International Patent Application No. PCT/CN2019/124440, filed Dec. 11, 2019, which claims priority to Chinese Patent Application No. 201811518172.2 filed with the CN1PA on Dec. 12, 2018, the disclosure of which is are incorporated herein by reference in their entireties.

TECHN1CAL FIELD

The embodiments of the present disclosure relate to, but are not limited to, communication technologies, and in particular, to a timing information configuration method, apparatus and system and a storage medium.

BACKGROUND

With the continuous advancement of radio technologies, various radio services are flourishing. However, spectrum resources on which the radio services are relied are limited. In the face of the increasing demand for bandwidth, spectrum resources ranging from 300 MHz to 3 GHz, which are adopted for the commercial communication in the related art, are in extreme shortage and cannot satisfy the requirements of future wireless communication. In new generation wireless communication systems (such as New Radio (NR) system (also referred to as a 5G system) or a new generation wireless communication system after 5G), a higher carrier frequency such as 28 GHz, 45 GHz or 70 GHz than that in the 4th generation mobile communication (4G) system is adopted for communication. Such a high-frequency channel has the defects of having a larger free-propagation loss, being easily absorbed by oxygen and being greatly affected by rain attenuation, thus seriously affecting the coverage performance of a high-frequency communication system. However, a carrier frequency corresponding to such high-frequency communication has a shorter wavelength, ensuring that more antenna elements can be accommodated per unit area. The arrangement of more antenna elements means that the beamforming method can be used to increase antenna gains, ensuring the coverage performance of high-frequency communication.

As a dense cell has been increasingly become an important application scenario, the dense cell requires more network deployment cost. However, the introduction of wireless backhaul transmission can make the network deployment easier and greatly reduce the network deployment cost. In addition, since the NR system includes the high-frequency band, the physical characteristics of the high-frequency carrier determine the coverage range of the NR system. This fact brings about a huge challenge, but wireless backhaul transmission can also solve this problem. Base on the above requirement, projects have been initiated for integrated access and backhaul (IAB) in the NR system. For ease of description, several labels are defined herein, that is, $(L_{P,DL}, L_{P,UL})$, $(L_{C,DL}, L_{C,UL})$, and $(L_{A,DL}, L_{A,UL})$. $(L_{p,DL}, L_{p,UL})$ denotes the downlink (DL) and uplink (UL) between a node and a parent node. The preceding DL and UL may be considered as Backhaul links (BLs), and the preceding node may be considered as a child node of the parent node. $(L_{C,DL}, L_{C,UL})$ denotes the DL and UL between a node and a child node. The preceding DL and UL may be considered as BLs, and the preceding node may be considered as a parent node of the child node. $(L_{A,DL}, L_{A,UL})$ denotes the DL and UL between a node and a user equipment. The preceding DL and UL may be considered as access links (ALs). The parent node may also be a donor node (DN). Meanwhile, in order to overcome the problem of transmit-receive self-interference caused by a half-duplex relay node in an in-band scenario, the following manners of multiplexing between a BL and an AL are proposed: time division multiplexing (TDM), frequency division multiplexing (FDM), and spatial division multiplexing (SDM), where TDM indicates that different time resources are used between the BL and the AL, SDM indicates that different beam resources are used between the BL and the AL, and FDM indicates that different frequency resources are used between the BL and the AL. In the standard, two stages are also defined for a relay node (RN) (RN is also referred to as an IAB node), that is, stage 1 (stage_1) and stage 2 (stage_2). Stage 1 (stage_1) indicates that the relay node synchronously and initially accesses a network as a user equipment (or mobile terminal) after being powered, that is, the relay node is in a "user equipment mode". Stage 2 (stage_2) indicates that the relay node communicates with other nodes or user equipment as a node (or centralized unit or distributed unit) after synchronously and initially accessing the network, that is, the relay node is in a "node mode".

On the other hand, the distance between each user equipment and a base station is different in the wireless communication system. Therefore, in order to ensure that the data transmitted by each user equipment reaches the base station side at the same time, the base station informs, through a timing advance command (TAC), the user equipment of how much earlier to perform transmission. After receiving a TAC in a random access response (RAR) (TAC in RAR) or a TAC in media access control control elements (MAC CE) (TAC in MAC CE), the user equipment performs transmission in advance at a corresponding time point. However, the standard has not provided clear solutions to the problem of timing information configuration between hop links, especially the timing information indication after the introduction of a negative TA, and the problem of timing information maintenance between different links after the introduction of the RN into the communication system.

SUMMARY

The embodiments of the present disclosure provide a timing information configuration method, apparatus and system and a storage medium, which can implement configuration of timing information.

A timing information configuration method is provided in the embodiments of the present disclosure. The method includes the step described below.

A first node predefines or configures timing information of a second node; where the timing information includes at least one of: a timing mode, a downlink transmission timing alignment mode, a timing advance (TA) configuration mode, a TA value, an offset of a TA value, a number of orthogonal frequency division multiplexing (OFDM) symbols that an uplink transmission timing is advanced or delayed relative to a downlink transmission timing for alignment, or a number of OFDM symbols that an uplink reception timing is advanced or delayed relative to a downlink reception timing for alignment.

A timing information configuration method is provided in the embodiments of the present disclosure. The method includes the step described below.

A second node determines timing information of the second node in a manner of predefinition or in a manner of being configured; where the timing information includes at least one of: a timing mode, a downlink transmission timing alignment mode, a TA configuration mode, a TA value, an offset of a TA value, a number of OFDM symbols that an uplink transmission timing is advanced or delayed relative to a downlink transmission timing for alignment, or a number of OFDM symbols that an uplink reception timing is advanced or delayed relative to a downlink reception timing for alignment.

A timing information configuration apparatus is provided in the embodiments of the present disclosure. The apparatus includes a configuration module.

The configuration module is configured to predefine or configure timing information of a second node; where the timing information includes at least one of: a timing mode, a downlink transmission timing alignment mode, a TA configuration mode, a TA value, an offset of a TA value, a number of OFDM symbols that an uplink transmission timing is advanced or delayed relative to a downlink transmission timing for alignment, or a number of OFDM symbols that an uplink reception timing is advanced or delayed relative to a downlink reception timing for alignment.

A timing information configuration apparatus is provided in the embodiments of the present disclosure. The apparatus includes a determination module.

The determination module is configured to determine timing information of a second node in a manner of predefinition or in a manner of being configured; where the timing information includes at least one of: a timing mode, a downlink transmission timing alignment mode, a TA configuration mode, a TA value, an offset of a TA value, a number of OFDM symbols that an uplink transmission timing is advanced or delayed relative to a downlink transmission timing for alignment, or a number of OFDM symbols that an uplink reception timing is advanced or delayed relative to a downlink reception timing for alignment.

A timing information configuration apparatus is provided in the embodiments of the present disclosure. The apparatus includes a processor and a computer-readable storage medium. The computer-readable storage medium stores an instruction. When the instruction is executed by the processor, any timing information configuration method described above is implemented.

A computer-readable storage medium is provided in the embodiments of the present disclosure. The computer-readable storage medium stores a computer program which, when executed by a processor, implements steps of any timing information configuration method described above.

A timing information configuration system is provided in the embodiments of the present disclosure. The system includes a first node and a second node.

The first node is configured to predefine or configure timing information of the second node.

The second node is configured to determine timing information of the second node in a manner of predefinition or in a manner of being configured.

The timing information includes at least one of: a timing mode, a downlink transmission timing alignment mode, a TA configuration mode, a TA value, an offset of a TA value, a number of OFDM symbols that an uplink transmission timing is advanced or delayed relative to a downlink transmission timing for alignment, or a number of OFDM symbols that an uplink reception timing is advanced or delayed relative to a downlink reception timing for alignment.

The embodiments of the present disclosure includes that the first node predefines or configures the timing information of the second node; where the timing information includes at least one of: the timing mode, the downlink transmission timing alignment mode, the TA configuration mode, the TA value, the offset of the TA value, the number of OFDM symbols that the uplink transmission timing is advanced or delayed relative to the downlink transmission timing for alignment, or the number of OFDM symbols that the uplink reception timing is advanced or delayed relative to the downlink reception timing for alignment. The embodiments of the present disclosure includes that the second node determines the timing information of the second node in the manner of predefinition or in the manner of being configured. The configuration of the timing information is implemented in the embodiments of the present disclosure.

BRIEF DESCRIPTION OF DRAWINGS

FIG. 1 is a flowchart of a timing information configuration method according to an embodiment of the present disclosure;

FIG. 3 is a flowchart of a timing information configuration method according to another embodiment of the present disclosure;

FIG. 4 is a schematic diagram of a node topology according to an embodiment of the present disclosure;

DETAILED DESCRIPTION

Embodiments of the present disclosure are described in detail hereinafter in conjunction with the drawings. It is to be noted that if not in collision, the embodiments and features therein in the present disclosure may be combined with each other.

The steps illustrated in the flowcharts of the drawings may be performed by a computer system such as a group of computers capable of executing instructions. Further, although logical sequences are illustrated in the flowcharts, the illustrated or described steps may be performed in sequences different from those illustrate herein in some cases.

Referring to FIG. 1, an embodiment of the present disclosure provides a timing information configuration method. The method includes the step described below.

In step 100, a first node predefines or configures timing information of a second node; where the timing information includes at least one of: a timing mode, a reference timing alignment mode, a TA configuration mode, a TA value, an offset of a TA value, a number of OFDM symbols that an uplink transmission link is advanced or delayed relative to a downlink transmission link for alignment, or a number of OFDM symbols that an uplink reception link is advanced or delayed relative to a downlink reception link for alignment.

In the embodiment of the present disclosure, a timing refers to the time when a node performs transmission or reception and corresponds to the boundary of a certain time domain symbol, slot, subframe, wireless frame or superframe.

A reference timing refers to absolute time, either a downlink transmission timing or an uplink reception timing. A reference timing alignment mode may be a downlink transmission timing alignment mode.

The absolute time refers to the time when the time is 0, or the absolute time refers to the time index of a certain time domain symbol, slot, subframe, wireless frame, or superframe.

Slot indexes refer to the numerals of several slots included in a wireless frame.

In the embodiment of the present disclosure, when two or more pieces of timing information are included, the two or more pieces of timing information may be configured separately or simultaneously. The specific configuration sequence is not limited in the embodiment of the present disclosure.

Various timing information described above is described in detail below.

1. Timing Mode

In the embodiment of the present disclosure, one or more types of timing modes may be defined at will, and the types of the timing modes are not intended to limit the scope of embodiment of the present disclosure. For example, the timing mode includes at least one of a first timing mode, a second timing mode, a third timing mode, or a hybrid timing mode.

Figure 2A:
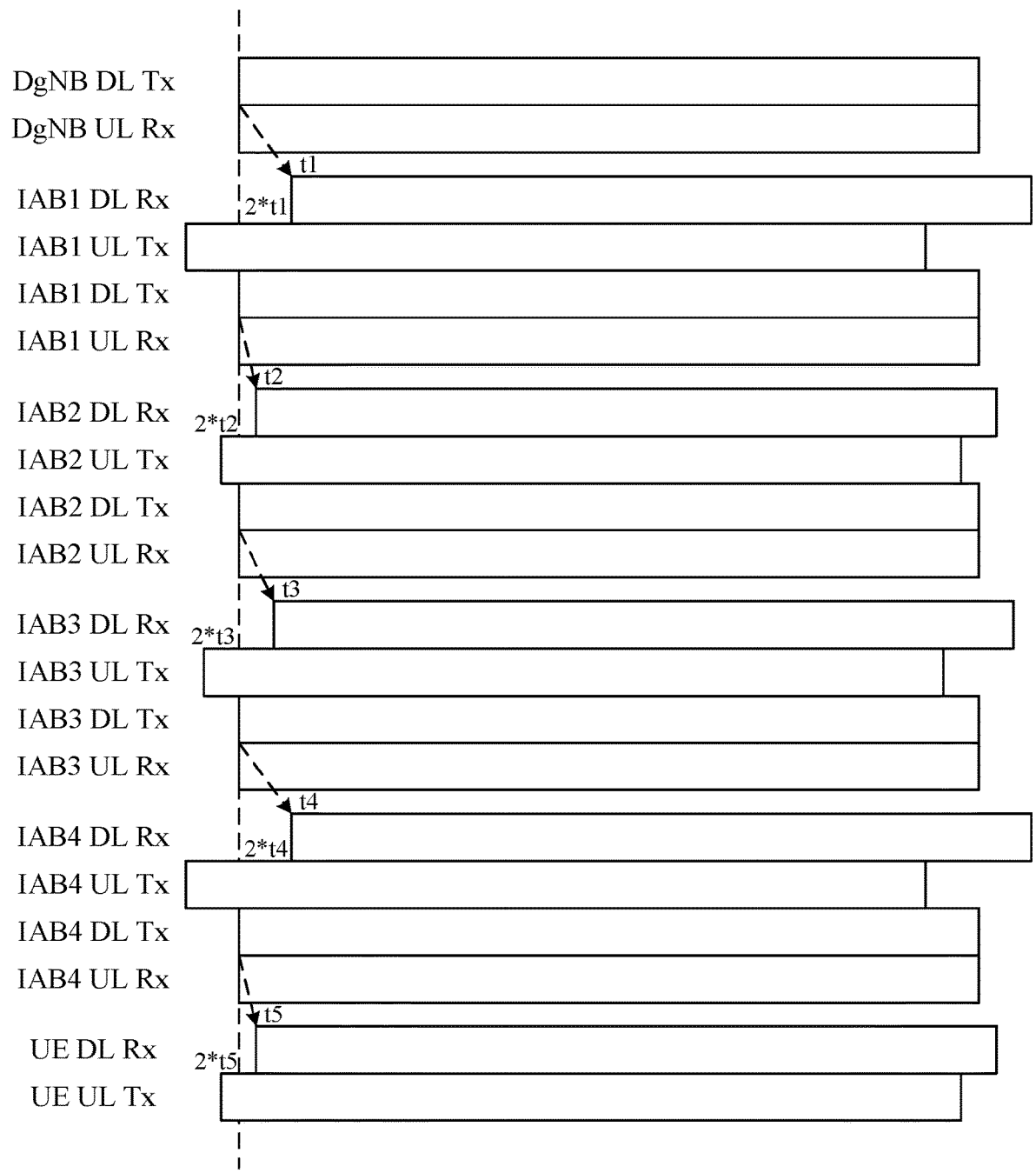
FIG. 2A is a schematic diagram of a first timing mode according to an embodiment of the present disclosure.

The first timing mode includes that a reference timing of each node is aligned with a reference timing of a donor node. As shown in FIG. 2A, when the reference timing is the downlink transmission timing, the downlink transmission timings of all nodes are aligned, and the dotted lines shown in FIG. 2A denote the downlink transmission timings. In the figure, t1 denotes the propagation delay (PD) of the first hop, t2 denotes the PD of the second hop, t3 denotes the PD of the third hop, t4 denotes the PD of the fourth hop, and t5 denotes the PD of the fifth hop.

Figure 2B:
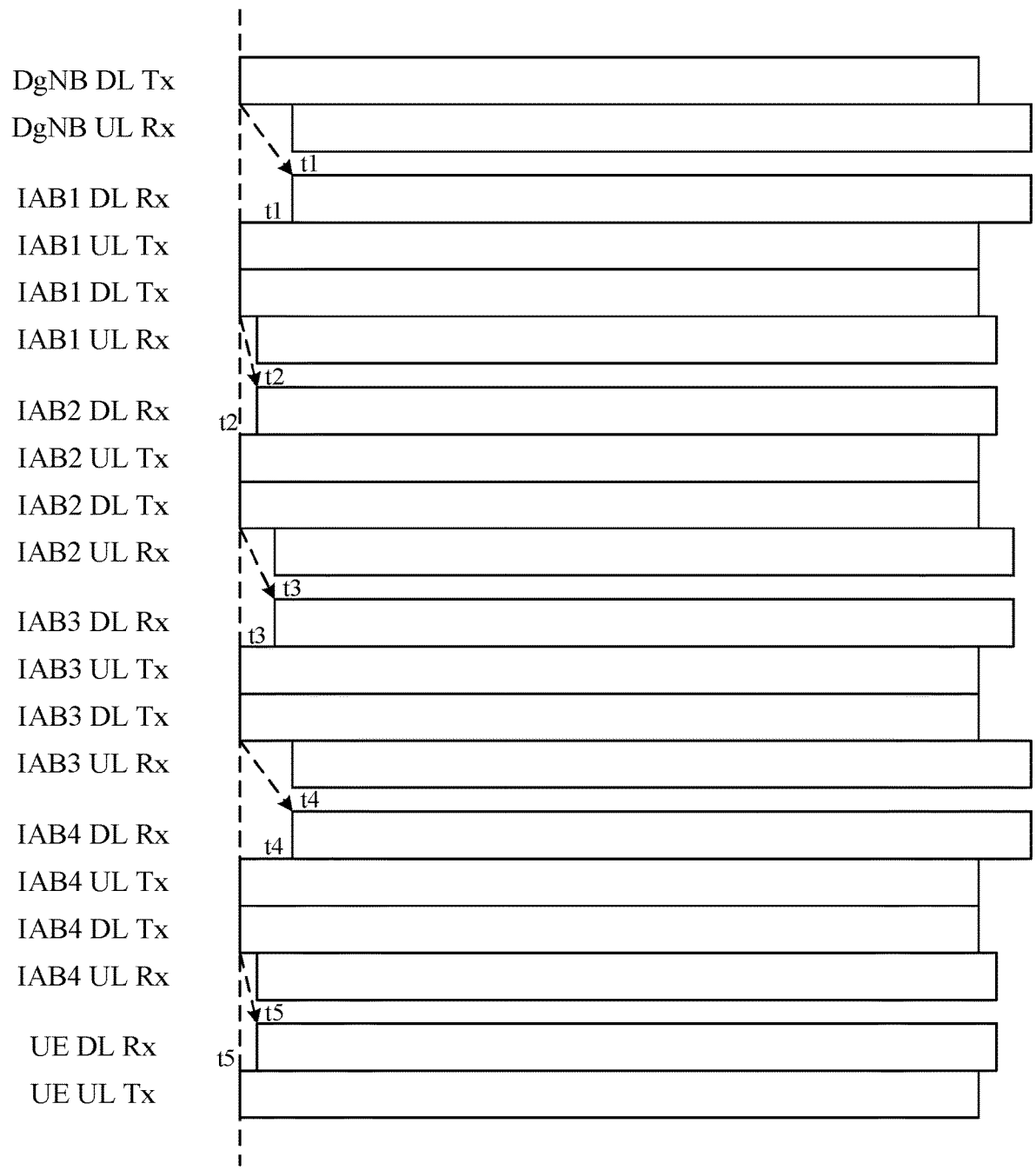
FIG. 2B is schematic diagram one of a second timing mode according to an embodiment of the present disclosure.
Figure 2C:
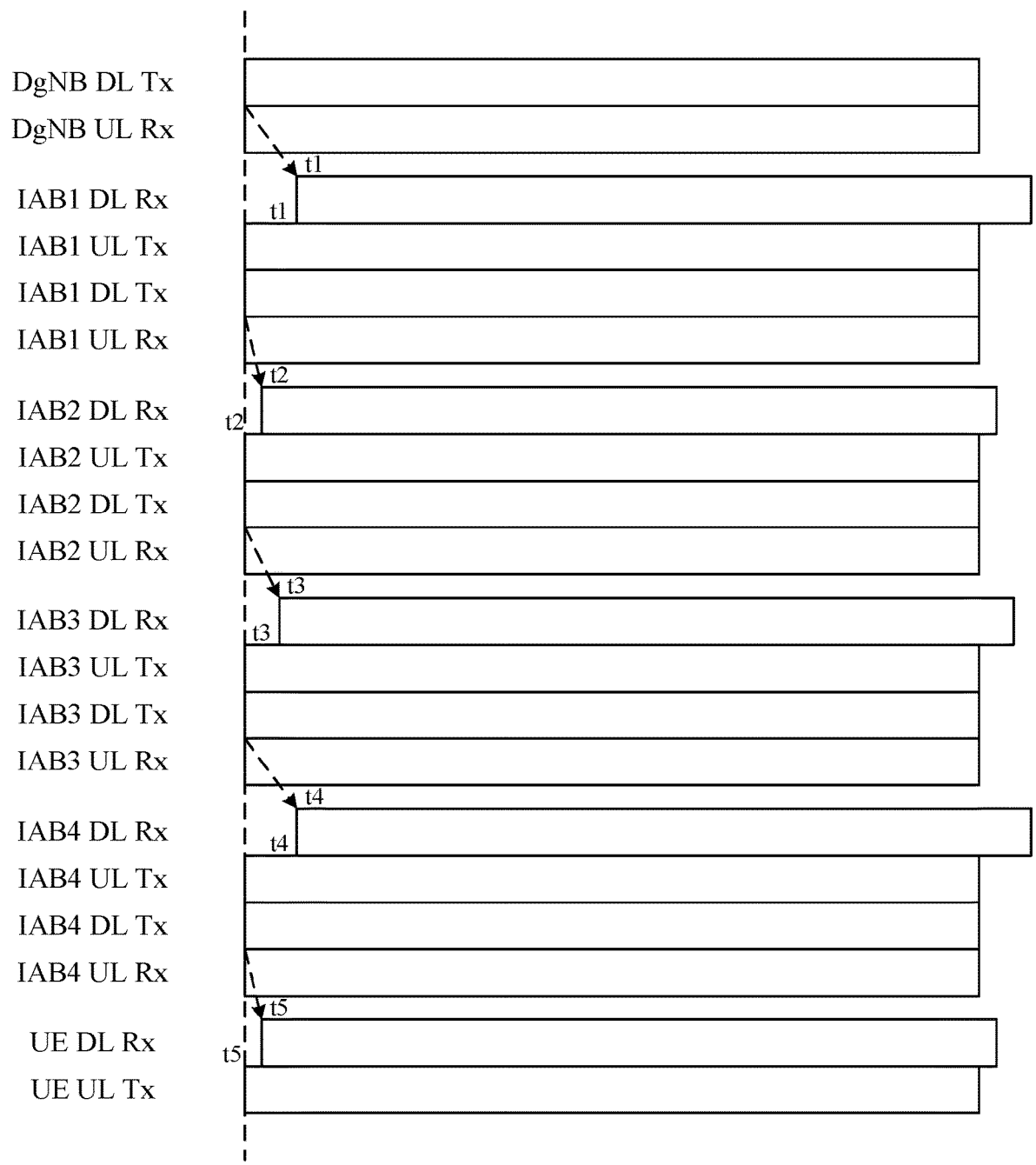
FIG. 2C is schematic diagram two of a second timing mode according to an embodiment of the present disclosure.

The second timing mode includes that a reference timing of each node is aligned with a reference timing of a donor node and an uplink transmission timing of each respective node is aligned with the reference timing of each respective node. As shown in FIGS. 2B and 2C, when the reference timing is the downlink transmission timing, the downlink transmission timings of all nodes are aligned, and the uplink transmission timing of each node is aligned with the downlink transmission timing of the each node. The dotted lines shown in FIGS. 2B and 2C are the downlink transmission timings and the uplink transmission timings. In the figure, t1 denotes the propagation delay (PD) of the first hop, t2 denotes the PD of the second hop, t3 denotes the PD of the third hop, t4 denotes the PD of the fourth hop, and t5 denotes the PD of the fifth hop.

Figure 2D:
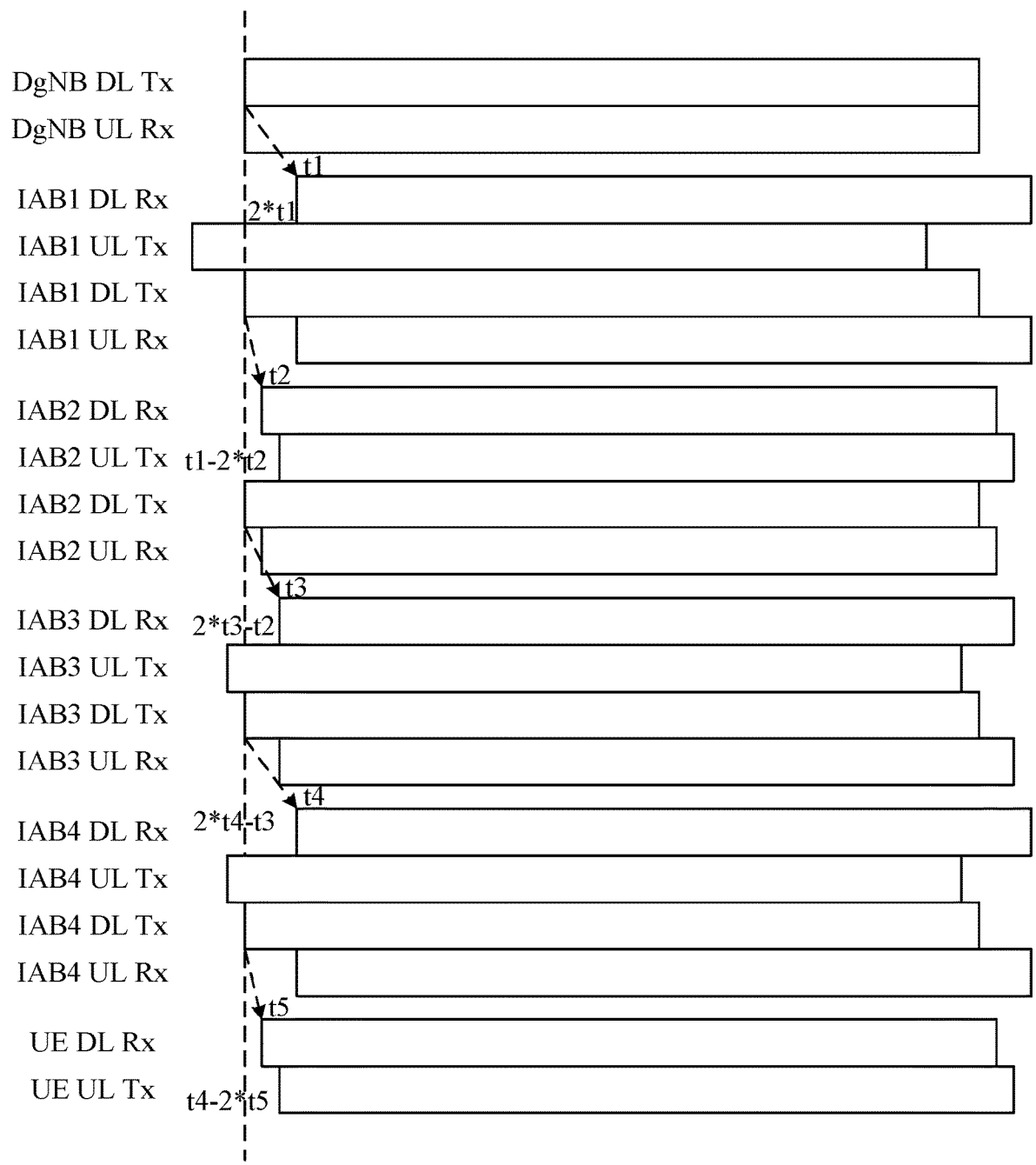
FIG. 2D is a schematic diagram of a third timing mode according to an embodiment of the present disclosure.

The third timing mode includes that a reference timing of each node is aligned with a reference timing of a donor node and an uplink reception timing of each respective node is aligned with a downlink reception timing of each respective node. As shown in FIG. 2D, when the reference timing is the downlink transmission timing, the downlink transmission timings of all nodes are aligned, and the uplink reception timing of each node is aligned with the downlink reception timing of the each node. The dotted lines shown in FIG. 2D denote the downlink transmission timings. In the figure, t1 denotes the propagation delay (PD) of the first hop, t2 denotes the PD of the second hop, t3 denotes the PD of the third hop, t4 denotes the PD of the fourth hop, and t5 denotes the PD of the fifth hop.

The hybrid timing mode includes at least one of the modes described below.

In the slot corresponding to the remainder i obtained after a slot index is divided by M, the timing mode of the second node is any one of the first timing mode, the second timing node or the third timing node. The timing nodes of the second node are different in slots corresponding to different remainders i. M is an integer greater than or equal to 2, and i is any integer from 0 to (M −1). For example, a timing mode of the second node in a first slot is the second timing mode; and a timing mode of the second node in a second slot is the third timing mode. A remainder obtained after a slot index of the first slot is divided by 2 is a first value, a remainder obtained after a slot index of the second slot is divided by 2 is a second value, and the first value and the second value are different and are each either 0 or 1. For example, a timing mode of the second node in a third slot is the first timing mode, a timing mode of the second node in a fourth slot is the second timing mode, and a timing mode of the second node in a fifth slot is the third timing mode. A remainder obtained after a slot index of the third slot is divided by 3 is a third value, a remainder obtained after a slot index of the fourth slot is divided by 3 is a fourth value, a remainder obtained after a slot index of the fifth slot is divided by 3 is a fifth value, and the third value, the fourth value, and the fifth value are different and are each any one of 0, 1, or 2.

A timing mode of simultaneous transmission and a timing mode of simultaneous reception are simultaneously supported. That is, the timing mode of simultaneous transmission and the timing mode of simultaneous reception are supported at the same time moment.

In an embodiment of the present disclosure, the step in which the first node predefines the timing mode of the second node includes the step described below.

The first node predefines any one of the first timing mode, the second timing mode, the third timing node, or the hybrid timing mode as the timing mode of the second node.

In another embodiment of the present disclosure, the step in which the first node predefines the timing mode of the second node includes at least one of the cases described below.

In a case where a time division multiplexing manner is adopted for all hop links including a link between the first node and the second node, the first node predefines the first timing mode as the timing mode of the second node.

In a case where a spatial division multiplexing manner or a frequency division multiplexing manner is adopted for all hop links including a link between the first node and the second node and a simultaneous transmission mechanism is adopted for an uplink transmission of the second node and a downlink transmission of the second node, the first node predefines the second timing mode as the timing mode of the second node.

In a case where a spatial division multiplexing manner or a frequency division multiplexing manner is adopted for all hop links including a link between the first node and the second node and a simultaneous reception mechanism is adopted for an uplink reception of the second node and a downlink reception of the second node, the first node predefines the third timing mode as the timing mode of the second node.

In another embodiment of the present disclosure, the step in which the first node predefines the timing mode of the second node includes at least one of the steps described below.

The first node predefines the first timing mode as a timing mode of the second node within a first time resource.

The first node predefines the second timing mode as a timing mode of the second node within a second time resource.

The first node predefines the third timing mode as a timing mode of the second node within a third time resource.

The first time resource is a slot corresponding to a third value which is a remainder obtained after a slot index is divided by 3; the second time resource is a slot corresponding to a fourth value which is a remainder obtained after a slot index is divided by 3; and the third time resource is a slot corresponding to a fifth value which is a remainder obtained after a slot index is divided by 3. The third value, the fourth value, and the fifth value are different and are each any one of 0, 1, or 2.

In an embodiment of the present disclosure, the step in which the first node configures the timing mode of the second node includes the step described below.

The first node directly configures the timing mode of the second node.

Alternatively, the first node configures the timing mode of the second node according to a timing mode capability reported by the second node. The timing mode capability refers to whether the second node supports a timing mode.

The step in which the first node configures the timing mode of the second node according to the timing mode capability reported by the second node includes at least one of the cases described below.

In a case where the timing mode capability reported by the second node is that the second node has a first capability, the first node configures the second timing mode as the timing mode of the second node; where the first capability includes any one of the following: the second node supports the second timing mode; or the second node has a capability of simultaneous transmission of an uplink transmission and a downlink transmission.

In a case where the timing mode capability reported by the second node is that the second node does not have a first capability, the first node configures the first timing mode or the third timing mode as the timing mode of the second node.

In a case where the timing mode capability reported by the second node is that the second node has a second capability, the first node configures the third timing mode as the timing mode of the second node; where the second capability includes any one of the following: the second node supports the third timing mode; or the second node has a capability of simultaneous reception of an uplink reception and a downlink reception.

In a case where the timing mode capability reported by the second node is that the second node does not have a second capability, the first node configures the first timing mode or the second timing mode as the timing mode of the second node.

In a case where the timing mode capability reported by the second node is that the second node has a third capability, the first node configures the hybrid timing mode as the timing mode of the second node; where the third capability includes any one of the following: the second node supports the hybrid timing mode; or the second node supports a timing mode of simultaneous transmission of an uplink transmission and a downlink transmission and a timing mode of simultaneous reception of an uplink reception and a downlink reception.

In a case where the timing mode capability reported by the second node is that the second node does not have a third capability, the first node configures the first timing mode as the timing mode of the second node.

In an embodiment of the present disclosure, the step in which the first node configures the timing mode of the second node includes the step described below.

The first node configures the timing mode of the second node in a manner of first signaling.

Alternatively, the first node configures the timing mode of the second node in a manner of Operation and Maintenance (OAM). Specifically, the OAM (that is, the first node) generates timing mode information and transmits the timing mode information to the timing mode of the second node.

The first signaling includes wireless air interface signaling, and the wireless air interface signaling includes at least one of: higher-layer signaling, media access control (MAC) signaling, or physical layer signaling.

Any one of the first timing mode, the second timing mode, the third timing mode, or the hybrid timing mode is represented by any X binary states among $2^A$ binary states represented by A bits in the first signaling; where A and X are each an integer greater than or equal to 1.

2. Reference Timing Alignment Mode

In the embodiment of the present disclosure, the reference timing alignment mode is a reference timing alignment mode in a case where the timing mode is the second timing mode.

In the embodiment of the present disclosure, the reference timing alignment mode may be defined at will. For example, the reference timing alignment mode includes at least one of a first reference timing alignment mode, a second reference timing alignment mode, or a hybrid reference timing alignment mode.

The first reference timing alignment mode includes at least one of: in a case where the first timing mode and the second timing mode are performed in parallel, determining a reference timing between nodes according to a reference timing of the first timing mode, where specifically, the reference timing of the first timing mode may be used as the reference timing between nodes; or in a case where the third timing mode and the second timing mode are performed in parallel, determining a reference timing between nodes according to a reference timing of the third timing mode, where specifically, the reference timing of the third timing mode may be used as the reference timing between nodes.

The second reference timing alignment mode includes determining a reference timing between nodes according to a time difference between a reference timing of the first node and an uplink reception timing and a time difference between a reference timing of the second node and a downlink reception timing. Specifically, if the time difference between the reference timing of the first node and the uplink reception timing is greater than the time difference between the reference timing of the second node and the downlink reception timing, the second node advances the reference timing of the second node; if the time difference between the reference timing of the first node and the uplink reception timing is less than the time difference between the reference timing of the second node and the downlink reception timing, the second node delays the reference timing of the second node.

The hybrid reference timing alignment mode includes: adopting the first reference timing alignment mode from a first reference timing alignment to an N-th reference timing alignment, and adopting the second reference timing alignment mode after the N-th reference timing alignment; where N is an integer greater than or equal to 1.

In the embodiment of the present disclosure, the step in which the first node predefines the reference timing alignment mode of the second node includes the step described below.

The first node predefines any one of the first reference timing alignment mode, the second reference timing alignment mode, or the hybrid reference timing alignment mode as the reference timing alignment mode of the second node.

In the embodiment of the present disclosure, the step in which the first node configures the reference timing alignment mode of the second node includes the step described below.

The first node configures the reference timing alignment mode of the second node in a manner of second signaling.

Alternatively, the first node configures the reference timing alignment mode of the second node in the manner of OAM.

The second signaling includes wireless air interface signaling, and the wireless air interface signaling includes at least one of: higher-layer signaling, media access control (MAC) signaling, or physical layer signaling.

Any one of the first reference timing alignment mode, the second reference timing alignment mode, or the hybrid reference timing alignment mode is represented by any Y binary states among $2^B$ binary states represented by B bits in the second signaling; where B and Y are each an integer greater than or equal to 1.

In the embodiment of the present disclosure, the step in which the first node configures the reference timing alignment mode of the second node includes the step described below.

The first node directly configures the reference timing alignment mode of the second node.

Alternatively, the first node configures the reference timing alignment mode of the second node according to a reference timing alignment mode capability reported by the second node. The reference timing alignment mode capability refers to whether the second node supports a reference timing alignment mode.

The step in which the first node configures the reference timing alignment mode of the second node according to the reference timing alignment mode capability reported by the second node includes at least one of the cases described below.

In a case where the reference timing alignment mode capability reported by the second node is that the second node does not support the first timing mode or the third timing mode, the first node configures the second reference timing alignment mode as the reference timing alignment mode of the second node.

In a case where the reference timing alignment mode capability reported by the second node is that the second node supports the first timing mode or the third timing mode, the first node configures the first reference timing alignment mode as the reference timing alignment mode of the second node.

3. TA Configuration Mode

In the embodiment of the present disclosure, the TA configuration mode is a TA configuration mode in a case where the timing mode is the third timing mode.

In the embodiment of the present disclosure, the TA configuration mode may be defined at will. For example, the TA configuration mode includes at least one of a first TA configuration mode, a second TA configuration mode, a third TA configuration mode, or a compatibility mode.

The first TA configuration mode includes configuring an absolute negative TA.

The second TA configuration mode includes configuring a relative negative TA.

The third TA configuration mode includes a symbol alignment for positive TA.

The compatibility mode includes that the first node configures a positive TA and that the first node schedules the second node in a non-slot (or mini-slot) manner.

In the embodiment of the present disclosure, the step in which the first node predefines the TA configuration mode includes the step described below.

The first node predefines any one of the first TA configuration mode, the second TA configuration mode, the third TA configuration mode, or the compatibility mode as the TA configuration mode.

In the embodiment of the present disclosure, the step in which the first node configures the TA configuration mode of the second node includes the step described below.

The first node configures the TA configuration mode of the second node in a manner of third signaling.

Alternatively, the first node configures the TA configuration mode of the second node in the manner of OAM.

The third signaling includes wireless air interface signaling, and the wireless air interface signaling includes at least one of: higher-layer signaling, media access control (MAC) signaling, or physical layer signaling.

Any one of the first TA configuration mode, the second TA configuration mode, the third TA configuration mode, or the compatibility mode is represented by any Z binary states among $2^C$ binary states represented by C bits in the third signaling; where C and Z are each an integer greater than or equal to 1.

In the embodiment of the present disclosure, the step in which the first node configures the TA configuration mode of the second node includes the step described below.

The first node directly configures the TA configuration mode of the second node.

Alternatively, the first node configures the TA configuration mode of the second node according to a TA configuration mode capability reported by the second node. The TA configuration mode capability refers to whether the second node has a negative TA capability.

In the embodiment of the present disclosure, the step in which the first node configures the TA configuration mode of the second node according to the TA configuration mode capability reported by the second node includes at least one of the cases described below.

In a case where the TA configuration mode capability reported by the second node is that the second node does not have a negative TA capability, the first node configures the third TA configuration mode or the compatibility mode as the TA configuration mode of the second node.

In a case where the TA configuration mode capability reported by the second node is that the second node has a negative TA capability, the first node configures the first TA configuration mode or the second TA configuration mode as the TA configuration mode of the second node.

4. TA Value

In the embodiment of the present disclosure, when the TA value is an absolute TA value, the TA value being greater than zero indicates that an uplink transmission timing of the second node is advanced relative to a downlink reception timing of the second node, the TA value being less than zero indicates that the uplink transmission timing of the second node is delayed relative to the downlink reception timing of the second node, and the TA value being equal to zero indicates that the uplink transmission timing of the second node is aligned with the downlink reception timing of the second node.

In the embodiment of the present disclosure, the step of determining the TA value includes at least one of the cases described below.

In a case where the timing mode is the first timing mode, it is determined that an attribute of a TA value of a 0-th hop link is equal to 0.

In a case where the timing mode is the first timing mode, it is determined that an attribute of a TA value of an i-th hop link is greater than or equal to 0, and the TA value of the i-th hop link is 2PD(i); where PD(i) is the propagation delay of the i-th hop link.

In a case where the timing mode is the second timing mode, it is determined that an attribute of a TA value of a 0-th hop link is equal to 0.

In a case where the timing mode is the second timing mode, it is determined that an attribute of a TA value of an i-th hop link is greater than or equal to 0, and the TA value of the i-th hop link is PD(i); where PD(i) is the propagation delay of the i-th hop link.

In a case where the timing mode is the third timing mode, it is determined that an attribute of a TA value of a 0-th hop link is equal to 0.

In a case where the timing mode is the third timing mode, it is determined that an attribute of a TA value of a first hop link is greater than or equal to 0, and the TA value of the i-th hop link is 2PD(i); where PD(i) is the propagation delay of the i-th hop link.

In a case where the timing mode is the third timing mode and PD(i−1) is less than or equal to 2PD(i), it is determined that an attribute of a TA value of an i-th hop link is greater than or equal to 0, and the TA value of the i-th hop link is 2PD(i)−PD(i−1); where PD(i) is the propagation delay of the i-th hop link.

In a case where the timing mode is the third timing mode and PD(i−1) is greater than or equal to 2PD(i), it is determined that an attribute of a TA value of an i-th hop link is less than or equal to 0, and the TA value of the i-th hop link is −(PD(i−1)−2PD(i)).

In the embodiment of the present disclosure, the step in which the first node configures the TA value of the second node includes the step described below.

The first node configures the TA value of the second node through indication information bits.

The indication information bits comprise (D+1) bits, where D bits indicate a numerical value of the TA value and 1 bit indicates an attribute of the TA value; where D is an integer greater than or equal to 1.

In the embodiment of the present disclosure, the method includes at least one of the cases described below.

In a case where a bit interval corresponding to the TA value is a first sub-interval, an attribute of the TA value is greater than or equal to 0.

In a case where a bit interval corresponding to the TA value is a second sub-interval, an attribute of the TA value is less than or equal to 0.

An union of the first sub-interval and the second sub-interval is a TA value interval in a timing advance command (TAC).

5. Offset of a TA Value

In the embodiment of the present disclosure, when the offset of the TA value is an offset relative to a TA value at a specific time, the value of (TA+Offset) being greater than zero indicates that an uplink transmission timing of the second node is advanced relative to a downlink reception timing of the second node, the value of (TA+Offset) being less than zero indicates that the uplink transmission timing of the second node is delayed relative to the downlink reception timing of the second node, and the value of (TA+Offset) being equal to zero indicates that the uplink transmission timing of the second node is aligned with the downlink reception timing of the second node, where Offset is the offset of the TA value and (TA+Offset) indicates the sum of the TA value at the specific time and the offset of the TA value.

A time granularity corresponding to the Offset is the same as a time granularity corresponding to the TA value.

Alternatively, a time granularity corresponding to the Offset is different from a time granularity corresponding to the TA value.

The offset of the TA value is an offset relative to a latest TA value.

In the embodiment of the present disclosure, the offset is independent of a TAC in a random access response (RAR) or independent of a TAC in a media access control control element (MAC CE); or the offset has a nested relationship with a TAC in an RAR or a TAC in a MAC CE.

The offset having the nested relationship with the TAC in the RAR or the TAC in the MAC CE includes extending a TA value interval in the TAC in the MAC CE or in the TAC in the RAR into a union of a third sub-interval and a fourth sub-interval; where the third sub-interval indicates a TA value in the TAC in the MAC CE or in the TAC in the RAR, and the fourth sub-interval indicates the offset of the TA value.

In the embodiment of the present disclosure, the step in which the first node configures the offset of the TA value of the second node includes the step described below.

The first node configures the offset of the TA value of the second node in a manner of fourth signaling; the fourth signaling includes wireless air interface signaling, and the wireless air interface signaling includes at least one of: higher-layer signaling, media access control (MAC) signaling, or physical layer signaling.

Alternatively, the first node configures the offset of the TA value of the second node in the manner of OAM.

6. The Number of OFDM Symbols

In the embodiment of the present disclosure, a time length of OFDM symbols is determined according to any one of: min (SCS_UL_Tx, SCS_DL_Tx) or min (SCS_UL_Rx, SCS_DL_Rx).

SCS_UL_Tx is subcarrier spacing corresponding to an uplink transmission link of the second node, SC_S_DL_Tx is subcarrier spacing corresponding to a downlink transmission link of the second node, SCS_UL_Rx is subcarrier spacing corresponding to an uplink reception link of the second node, and SCS_DL_Rx is subcarrier spacing corresponding to a downlink reception link of the second node.

Referring to FIG. 3, another embodiment of the present disclosure provides a timing information configuration method. The method includes the step described below.

In step 300, a second node determines timing information in a manner of predefinition or in a manner of being configured; where the timing information includes at least one of: a timing mode, a reference timing alignment mode, a TA configuration mode, a TA value, an offset of a TA value, a number of OFDM symbols that an uplink transmission link is advanced or delayed relative to a downlink transmission link for alignment, or a number of OFDM symbols that an uplink reception link is advanced or delayed relative to a downlink reception link for alignment.

In the embodiment of the present disclosure, a timing refers to the time when a node performs transmission or reception and corresponds to the boundary of a certain time domain symbol, slot, subframe, wireless frame or superframe.

A reference timing refers to absolute time, either a downlink transmission timing or an uplink reception timing.

The absolute time refers to the time when the time is 0, or the absolute time refers to the time index of a certain time domain symbol, slot, subframe, wireless frame, or superframe.

Slot indexes refer to the numerals of several slots included in a wireless frame.

In the embodiment of the present disclosure, when two or more pieces of timing information are included, the two or more pieces of timing information may be configured separately or simultaneously. The specific configuration sequence is not limited in the embodiment of the present disclosure.

Various timing information described above is described in detail below.

1. Timing Mode

In the embodiment of the present disclosure, one or more types of timing modes may be defined at will, and the types of the timing modes are not intended to limit the scope of embodiment of the present disclosure. For example, the timing mode includes at least one of a first timing mode, a second timing mode, a third timing mode, or a hybrid timing mode.

The first timing mode includes that a reference timing of each node is aligned with a reference timing of a donor node. As shown in FIG. 2A, when the reference timing is the downlink transmission timing, the downlink transmission timings of all nodes are aligned, and the dotted lines shown in FIG. 2A denote the downlink transmission timings. In the figure, t1 denotes the propagation delay (PD) of the first hop, t2 denotes the PD of the second hop, t3 denotes the PD of the third hop, t4 denotes the PD of the fourth hop, and t5 denotes the PD of the fifth hop.

The second timing mode includes that a reference timing of each node is aligned with a reference timing of a donor node and that an uplink transmission timing of the each node is aligned with the reference timing of the each node. As shown in FIGS. 2B and 2C, when the reference timing is the downlink transmission timing, the downlink transmission timings of all nodes are aligned, and the uplink transmission timing of each node is aligned with the downlink transmission timing of the each node. The dotted lines shown in FIGS. 2B and 2C are the downlink transmission timings and the uplink transmission timings. In the figure, t1 denotes the propagation delay (PD) of the first hop, t2 denotes the PD of the second hop, t3 denotes the PD of the third hop, t4 denotes the PD of the fourth hop, and t5 denotes the PD of the fifth hop.

The third timing mode includes that a reference timing of each node is aligned with a reference timing of a donor node and that an uplink reception timing of the each node is aligned with a downlink reception timing of the each node. As shown in FIG. 2D, when the reference timing is the downlink transmission timing, the downlink transmission timings of all nodes are aligned, and the uplink reception timing of each node is aligned with the downlink reception timing of the each node. The dotted lines shown in FIG. 2D denote the downlink transmission timings. In the figure, t1 denotes the propagation delay (PD) of the first hop, t2 denotes the PD of the second hop, t3 denotes the PD of the third hop, t4 denotes the PD of the fourth hop, and t5 denotes the PD of the fifth hop.

The hybrid timing mode includes at least one of the modes described below.

In the slot corresponding to the remainder i obtained after a slot index is divided by M, the timing mode of the second node is any one of the first timing mode, the second timing node or the third timing node. The timing nodes of the second node are different in slots corresponding to different remainders i. M is an integer greater than or equal to 2, and i is any integer from 0 to (M−1). For example, a timing mode of the second node in a first slot is the second timing mode; and a timing mode of the second node in a second slot is the third timing mode. A remainder obtained after a slot index of the first slot is divided by 2 is a first value, a remainder obtained after a slot index of the second slot is divided by 2 is a second value, and the first value and the second value are different and are each either 0 or 1. For example, a timing mode of the second node in a third slot is the first timing mode, a timing mode of the second node in a fourth slot is the second timing mode, and a timing mode of the second node in a fifth slot is the third timing mode. A remainder obtained after a slot index of the third slot is divided by 3 is a third value, a remainder obtained after a slot index of the fourth slot is divided by 3 is a fourth value, a remainder obtained after a slot index of the fifth slot is divided by 3 is a fifth value, and the third value, the fourth value, and the fifth value are different and are each any one of 0, 1, or 2.

A timing mode of simultaneous transmission and a timing mode of simultaneous reception are simultaneously supported. That is, the timing mode of simultaneous transmission and the timing mode of simultaneous reception are supported at the same time moment.

In an embodiment of the present disclosure, the step in which the second node determines the timing mode in the manner of predefinition includes the step described below.

The second node predefines any one of the first timing mode, the second timing mode, the third timing node, or the hybrid timing mode as the timing mode.

In another embodiment of the present disclosure, the step in which the second node determines the timing mode in the manner of predefinition includes at least one of the cases described below.

In a case where a time division multiplexing manner is adopted for all hop links including a link between a first node and the second node, the second node predefines the first timing mode as the timing mode.

In a case where a spatial division multiplexing manner or a frequency division multiplexing manner is adopted for all hop links including a link between a first node and the second node and a simultaneous transmission mechanism is adopted for an uplink transmission of the second node and a downlink transmission of the second node, the second node predefines the second timing mode as the timing mode.

In a case where a spatial division multiplexing manner or a frequency division multiplexing manner is adopted for all hop links including a link between a first node and the second node and a simultaneous reception mechanism is adopted for an uplink reception of the second node and a downlink reception of the second node, the second node predefines the third timing mode as the timing mode.

In another embodiment of the present disclosure, the step in which the second node determines the timing mode in the manner of predefinition includes at least one of the steps described below.

The second node predefines the first timing mode as a timing mode within a first time resource.

The second node predefines the second timing mode as a timing mode within a second time resource.

The second node predefines the third timing mode as a timing mode within a third time resource.

The first time resource is a slot corresponding to a third value which is a remainder obtained after a slot index is divided by 3; the second time resource is a slot corresponding to a fourth value which is a remainder obtained after a slot index is divided by 3; and the third time resource is a slot corresponding to a fifth value which is a remainder obtained after a slot index is divided by 3. The third value, the fourth value, and the fifth value are different and are each any one of 0, 1, or 2.

In the embodiment of the present disclosure, the method further includes that the second node reports a timing mode capability of the second node. The timing mode capability refers to whether the second node supports a timing mode.

In the embodiment of the present disclosure, the step in which the second node determines the timing mode in the manner of being configured includes the step described below.

The second node receives first signaling and determines the timing mode according to the first signaling.

Alternatively, the second node determines the timing mode of the second node in the manner of OAM.

The first signaling includes wireless air interface signaling, and the wireless air interface signaling includes at least one of: higher-layer signaling, media access control (MAC) signaling, or physical layer signaling.

Any one of the first timing mode, the second timing mode, the third timing mode, or the hybrid timing mode is represented by any X binary states among $2^A$ binary states represented by A bits in the first signaling; where A and X are each an integer greater than or equal to 1.

2. Reference Timing Alignment Mode

In the embodiment of the present disclosure, the reference timing alignment mode is a reference timing alignment mode in a case where the timing mode is the second timing mode.

In the embodiment of the present disclosure, the reference timing alignment mode may be defined at will. For example, the reference timing alignment mode includes at least one of a first reference timing alignment mode, a second reference timing alignment mode, or a hybrid reference timing alignment mode.

The first reference timing alignment mode includes at least one of: in a case where the first timing mode and the second timing mode are performed in parallel, determining a reference timing between nodes according to a reference timing of the first timing mode, where specifically, the reference timing of the first timing mode may be used as the reference timing between nodes; or in a case where the third timing mode and the second timing mode are performed in parallel, determining a reference timing between nodes according to a reference timing of the third timing mode, where specifically, the reference timing of the third timing mode may be used as the reference timing between nodes.

The second reference timing alignment mode includes determining a reference timing between nodes according to a time difference between a reference timing of the first node and an uplink reception timing and a time difference between a reference timing of the second node and a downlink reception timing.

The hybrid reference timing alignment mode includes: adopting the first reference timing alignment mode from a first reference timing alignment to an N-th reference timing alignment, and adopting the second reference timing alignment mode after the N-th reference timing alignment; where N is an integer greater than or equal to 1.

In the embodiment of the present disclosure, the step in which the second node determines the reference timing alignment mode of the second node in the manner of predefinition includes the step described below.

The second node predefines any one of the first reference timing alignment mode, the second reference timing alignment mode, or the hybrid reference timing alignment mode as the reference timing alignment mode of the second node.

In the embodiment of the present disclosure, the step in which the second node determines the reference timing alignment mode of the second node in the manner of being configured includes the step described below.

The second node receives second signaling and determines the reference timing alignment mode of the second node according to the second signaling.

Alternatively, the second node determines the reference timing alignment mode of the second node in the manner of OAM.

The second signaling includes wireless air interface signaling, and the wireless air interface signaling includes at least one of: higher-layer signaling, media access control (MAC) signaling, or physical layer signaling.

Any one of the first reference timing alignment mode, the second reference timing alignment mode, or the hybrid reference timing alignment mode is represented by any Y binary states among $2^B$ binary states represented by B bits in the second signaling; where B and Y are each an integer greater than or equal to 1.

In the embodiment of the present disclosure, the method further includes that the second node reports a reference timing alignment mode capability of the second node. The reference timing alignment mode capability refers to whether the second node supports a reference timing alignment mode.

3. TA Configuration Mode

In the embodiment of the present disclosure, the TA configuration mode is a TA configuration mode in a case where the timing mode is the third timing mode.

In the embodiment of the present disclosure, the TA configuration mode may be defined at will. For example, the TA configuration mode includes at least one of a first TA configuration mode, a second TA configuration mode, a third TA configuration mode, or a compatibility mode.

The first TA configuration mode includes configuring an absolute negative TA.

The second TA configuration mode includes configuring a relative negative TA.

The third TA configuration mode includes a symbol alignment for positive TA.

The compatibility mode includes that the first node configures a positive TA and that the first node schedules the second node in a non-slot manner.

In the embodiment of the present disclosure, the step in which the first node predefines the TA configuration mode includes the step described below.

The first node predefines any one of the first TA configuration mode, the second TA configuration mode, the third TA configuration mode, or the compatibility mode as the TA configuration mode.

In the embodiment of the present disclosure, the step in which the second node determines the TA configuration mode of the second node in the manner of being configured includes the step described below.

The second node receives third signaling and determines the TA configuration mode of the second node according to the third signaling.

Alternatively, the second node determines the TA configuration mode of the second node in the manner of OAM.

The third signaling includes wireless air interface signaling, and the wireless air interface signaling includes at least one of: higher-layer signaling, media access control (MAC) signaling, or physical layer signaling.

Any one of the first TA configuration mode, the second TA configuration mode, the third TA configuration mode, or the compatibility mode is represented by any Z binary states among $2^C$ binary states represented by C bits in the third signaling; where C and Z are each an integer greater than or equal to 1.

In the embodiment of the present disclosure, the method further includes that the second node reports a TA configuration mode capability of the second node. The TA configuration mode capability refers to whether the second node has a negative TA capability.

4. TA Value

In the embodiment of the present disclosure, when the TA value is an absolute TA value, the TA value being greater than zero indicates that an uplink transmission timing of the second node is advanced relative to a downlink reception timing of the second node, the TA value being less than zero indicates that the uplink transmission timing of the second node is delayed relative to the downlink reception timing of the second node, and the TA value being equal to zero indicates that the uplink transmission timing of the second node is aligned with the downlink reception timing of the second node.

In the embodiment of the present disclosure, the step in which the second node determines the TA value of the second node in the manner of predefinition includes the cases described below.

In a case where the timing mode is the first timing mode, it is determined that an attribute of a TA value of a 0-th hop link is equal to 0.

In a case where the timing mode is the first timing mode, it is determined that an attribute of a TA value of an i-th hop link is greater than or equal to 0, and the TA value of the i-th hop link is 2PD(i); where PD(i) is the propagation delay of the i-th hop link.

In a case where the timing mode is the second timing mode, it is determined that an attribute of a TA value of a 0-th hop link is equal to 0.

In a case where the timing mode is the second timing mode, it is determined that an attribute of a TA value of an i-th hop link is greater than or equal to 0, and the TA value of the i-th hop link is PD(i); where PD(i) is the propagation delay of the i-th hop link.

In a case where the timing mode is the third timing mode, it is determined that an attribute of a TA value of a 0-th hop link is equal to 0.

In a case where the timing mode is the third timing mode, it is determined that an attribute of a TA value of a first hop link is greater than or equal to 0, and the TA value of the i-th hop link is 2PD(i); where PD(i) is the propagation delay of the i-th hop link.

In a case where the timing mode is the third timing mode and PD(i−1) is less than or equal to 2PD(i), it is determined that an attribute of a TA value of an i-th hop link is greater than or equal to 0, and the TA value of the i-th hop link is 2PD (i)−PD(i−1); where PD(i) is the propagation delay of the i-th hop link.

In a case where the timing mode is the third timing mode and PD(i−1) is greater than or equal to 2PD(i), it is determined that an attribute of a TA value of an i-th hop link is less than or equal to 0, and the TA value of the i-th hop link is −(PD(i−1)−2PD(i)).

In the embodiment of the present disclosure, the step in which the second node determines the TA value of the second node in the manner of being configured includes the step described below.

The second node receives indication information bits and determines the TA value of the second node according to the indication information bits.

Alternatively, the second node determines an attribute of the TA value according to a bit interval corresponding to the configured TA value.

Alternatively, the second node determines an attribute of the TA value according to propagation delay of a hop link.

The indication information bits comprise (D+1) bits, where D bits indicate a numerical value of the TA value and 1 bit indicates an attribute of the TA value; where D is an integer greater than or equal to 1.

The step in which the second node determines an attribute of the TA value according to a bit interval corresponding to the configured TA value includes at least one of the cases described below.

In a case where a bit interval corresponding to the TA value is a first sub-interval, it is determined that an attribute of the TA value is greater than or equal to 0.

In a case where a bit interval corresponding to the TA value is a second sub-interval, it is determined that an attribute of the TA value is less than or equal to 0.

An union of the first sub-interval and the second sub-interval is a TA value interval in a timing advance command (TAC).

5. Offset of a TA Value

In the embodiment of the present disclosure, the offset of the TA value is an offset relative to a TA value at a specific time, the value of (TA+Offset)being greater than zero indicates that an uplink transmission timing of the second node is advanced relative to a downlink reception timing of the second node, the value of (TA+Offset) being less than zero indicates that the uplink transmission timing of the second node is delayed relative to the downlink reception timing of the second node, and the value of (TA+Offset)being equal to zero indicates that the uplink transmission timing of the second node is aligned with the downlink reception timing of the second node, where Offset is the offset of the TA value.

A time granularity corresponding to the Offset is the same as a time granularity corresponding to the TA value.

Alternatively, a time granularity corresponding to the Offset is different from a time granularity corresponding to the TA value.

The offset of the TA value is an offset relative to a latest TA value.

In the embodiment of the present disclosure, the offset is independent of a TAC in a random access response (RAR) or independent of a TAC in a media access control control element (MAC CE); or the offset has a nested relationship with a TAC in an RAR or a TAC in a MAC CE.

The offset having the nested relationship with the TAC in the RAR or the TAC in the MAC CE includes extending a TA value interval in the TAC in the MAC CE or in the TAC in the RAR into a union of a third sub-interval and a fourth sub-interval; where the third sub-interval indicates a TA value in the TAC in the MAC CE or in the TAC in the RAR, and the fourth sub-interval indicates the offset of the TA value.

In the embodiment of the present disclosure, the step in which the second node determines the offset of the TA value of the second node in the manner of being configured includes the step described below.

The second node receives fourth signaling and determines the offset of the TA value of the second node according to the fourth signaling; the fourth signaling includes wireless air interface signaling, and the wireless air interface signaling includes at least one of: higher-layer signaling, media access control (MAC) signaling, or physical layer signaling.

Alternatively, the second node determines the offset of the TA value of the second node in the manner of OAM.

6. The Number of OFDM Symbols

In the embodiment of the present disclosure, a time length of OFDM symbols is determined according to any one of: min (SCS_UL_Tx, SCS_DL_Tx) or min (SCS_UL_Rx, SCS_DL_Rx).

SCS_UL_Tx is subcarrier spacing corresponding to an uplink transmission link of the second node, SC_S_DL_Tx is subcarrier spacing corresponding to a downlink transmission link of the second node, SCS_UL_Rx is subcarrier spacing corresponding to an uplink reception link of the second node, and SCS_DL_Rx is subcarrier spacing corresponding to a downlink reception link of the second node.

In embodiments of the present disclosure, nodes include, but are not limited to, a base station, or a relay node, or user equipment.

Methods of the embodiments of the present disclosure are illustrated below by way of example, and examples given are not intended to limit the scope of the embodiments of the present disclosure.

EXAMPLE ONE

Determining a Timing Mode

In the example, as shown in FIG. 4, N1 denotes a first node, N2 denotes a second node, N3 denotes a third node, and N4 denotes a fourth node; UE1 denotes a UE under the coverage of N1, UE2 denotes a UE under the coverage of N2, UE3 denotes a UE under the coverage of N3, and UE4 denotes a UE under the coverage of N4. N2 may be regarded as a child node of N1, and N1 may be regarded as a parent node of N2. Specifically, N1 may be regarded as the source parent node of N2 and N4 may be regarded as the target parent node of N2.

In this example, four timing modes are defined, that is, a first timing mode, a second timing mode, a third timing mode, and a hybrid timing mode. The characteristics of these four timing modes are described below.

The first timing mode includes that a reference timing of each node is aligned with a reference timing of a donor node. As shown in FIG. 2A, when the reference timing is the downlink transmission timing, the downlink transmission timings of all nodes are aligned, and the dotted lines shown in FIG. 2A denote the downlink transmission timings. In the figure, t1 denotes the propagation delay (PD) of the first hop, t2 denotes the PD of the second hop, t3 denotes the PD of the third hop, t4 denotes the PD of the fourth hop, and t5 denotes the PD of the fifth hop.

The second timing mode includes that a reference timing of each node is aligned with a reference timing of a donor node and that an uplink transmission timing of the each node is aligned with the reference timing of the each node. As shown in FIGS. 2B and 2C, when the reference timing is the downlink transmission timing, the downlink transmission timings of all nodes are aligned, and the uplink transmission timing of each node is aligned with the downlink transmission timing of the each node. The dotted lines shown in FIGS. 2B and 2C are the downlink transmission timings and the uplink transmission timings. In the figure, t1 denotes the propagation delay (PD) of the first hop, t2 denotes the PD of the second hop, t3 denotes the PD of the third hop, t4 denotes the PD of the fourth hop, and t5 denotes the PD of the fifth hop.

The third timing mode includes that a reference timing of each node is aligned with a reference timing of a donor node and that an uplink reception timing of the each node is aligned with a downlink reception timing of the each node. As shown in FIG. 2D, when the reference timing is the downlink transmission timing, the downlink transmission timings of all nodes are aligned, and the uplink reception timing of each node is aligned with the downlink reception timing of the each node. The dotted lines shown in FIG. 2D denote the downlink transmission timings. In the figure, t1 denotes the propagation delay (PD) of the first hop, t2 denotes the PD of the second hop, t3 denotes the PD of the third hop, t4 denotes the PD of the fourth hop, and t5 denotes the PD of the fifth hop.

The hybrid timing mode includes at least one of the modes described below.

In the slot corresponding to the remainder i obtained after a slot index is divided by M, the timing mode of the second node is any one of the first timing mode, the second timing node or the third timing node. The timing nodes of the second node are different in slots corresponding to different remainders i. M is an integer greater than or equal to 2, and i is any integer from 0 to (M−1). For example, a timing mode of the second node in a first slot is the second timing mode; and a timing mode of the second node in a second slot is the third timing mode. A remainder obtained after a slot index of the first slot is divided by 2 is a first value, a remainder obtained after a slot index of the second slot is divided by 2 is a second value, and the first value and the second value are different and are each either 0 or 1. For example, a timing mode of the second node in a third slot is the first timing mode, a timing mode of the second node in a fourth slot is the second timing mode, and a timing mode of the second node in a fifth slot is the third timing mode. A remainder obtained after a slot index of the third slot is divided by 3 is a third value, a remainder obtained after a slot index of the fourth slot is divided by 3 is a fourth value, a remainder obtained after a slot index of the fifth slot is divided by 3 is a fifth value, and the third value, the fourth value, and the fifth value are different and are each any one of 0, 1, or 2.

A timing mode of simultaneous transmission and a timing mode of simultaneous reception are simultaneously supported. That is, the timing mode of simultaneous transmission and the timing mode of simultaneous reception are supported at the same time moment.

Sub-Example One of Example One: Predefining a Timing Mode

Any one of the first timing mode, the second timing mode, the third timing node, or the hybrid timing mode is predefined as the timing mode.

For example, N1 and N2 predefine the first timing mode as the timing mode.

Alternatively, N1 and N2 predefine the second timing mode as the timing mode.

Alternatively, N1 and N2 predefine the third timing mode as the timing mode.

Sub-Example Two of Example One: Predefining a Timing Mode According to a Multiplexing Manner Any one of the first timing mode, the second timing mode, or the third timing node is predefined as the timing mode according to a multiplexing manner adopted for all hop links including a link between a first node and the second node.

For example, time division multiplexing is adopted between the link between N1 and N2 and each hop link of the other links, and N1 and N2 predefine the first timing mode as the timing mode.

For example, spatial division multiplexing or frequency division multiplexing is adopted for all hop links and a simultaneous transmission mechanism is adopted for the uplink transmission of N2 and the downlink transmission of N2, and then N1 and N2 predefine the second timing mode as the timing mode.

For example, spatial division multiplexing or frequency division multiplexing is adopted for all hop links, that is, a simultaneous reception mechanism is adopted for the uplink reception of N2 and the downlink reception of N2, and then N1 and N2 predefine the third timing mode as the timing mode.

Sub-Example Three of Example One: Predefining a Timing Mode Within a Time Resource Range The first time resource range, the second time resource range, and the third time resource range are each predefined with any one of the first timing mode, the second timing mode, or the third timing mode.

For example, N1 and N2 predefine the first timing mode as the timing mode in the slot corresponding to mod(slot index, 3)=0; N1 and N2 predefine the second timing mode as the timing mode in the slot corresponding to mod(slot index, 3)=1; and N1 and N2 predefine the third timing mode as the timing mode in the slot corresponding to mod(slot index, 3)=2.

Sub-Example Four of Example One: Configuring a Timing Mode

N1 configures first signaling for N2. N2 receives the first signaling and determines a timing mode according to the first signaling. The first signaling is configured for N2 in a manner of wireless air interface signaling or in a manner of Operation Administration and Maintenance (OAM). The wireless air interface signaling includes at least one of: higher-layer signaling, MAC signaling, or physical layer signaling.

It is assumed that the first signaling corresponds to A bits, and any X of the $2^A$ (A-th power of 2) binary states represent one or more of the first timing mode, the second timing mode, the third timing mode, and the hybrid timing mode, respectively.

For example, A=2, and any three of the corresponding four binary states represent the first timing mode, the second timing mode, and the third timing mode, respectively.

The remaining one binary state represents the hybrid timing mode of the second timing mode and the third timing mode. Optionally, the remaining one binary state represents the second timing mode in a slot corresponding to mod(slot index, 2)=0 and the third timing mode in a slot corresponding to mod(slot index, 2)=1.

Alternatively, the remaining one binary state represents a hybrid timing mode of the first timing mode, the second timing mode, and the third timing mode. Optionally, the remaining one binary state represents the first timing mode in a slot corresponding to mod(slot index, 3)=0, represents the second timing mode in a slot corresponding to mod(slot index, 3)=1, and represents the third timing mode in a slot corresponding to mod(slot index, 3)=2.

Alternatively, the remaining one binary state represents that a timing mode of simultaneous transmission and a timing mode of simultaneous reception are simultaneously supported.

Sub-example Five of Example One: a Node Reporting a Timing Mode Capability or a Timing Mode-Related Capability N2 reports the timing mode capability of N2 to N1, and N1 determines the timing mode according to the timing mode capability supported by N2.

N2 reports the capability of whether the uplink transmission of N2 and the downlink transmission of N2 can be simultaneously performed to N1, and N1 determines the timing mode according to whether N2 supports the capability of simultaneous transmission. Optionally, the second timing mode is adopted if N2 has the capability of simultaneous transmission, and the first timing mode or the third timing mode is adopted if N2 does not have the capability of simultaneous transmission.

N2 reports the capability of whether the uplink reception of N2 and the downlink reception of N2 can be simultaneously performed to N1, and N1 determines the timing mode according to whether N2 supports the capability of simultaneous reception. Optionally, the third timing mode is adopted if N2 has the capability of simultaneous reception, and the first timing mode or the second timing mode is adopted if N2 does not have the capability of simultaneous reception.

N2 reports the capability of whether the uplink transmission of N2 and the downlink transmission of N2 can be simultaneously performed to N1, N2 reports the capability of whether the uplink reception of N2 and the downlink reception of N2 can be simultaneously performed to N1. N1 determines the timing mode according to whether N2 supports the capability of simultaneous transmission and the capability of simultaneous reception. Optionally, the hybrid timing mode is adopted if N2 has the capability of simultaneous transmission and the capability of simultaneous reception, and the first timing mode is adopted if N2 does not have the capability of simultaneous transmission and the capability of simultaneous reception.

EXAMPLE TWO

Determining a Reference Timing Alignment Mode

In the example, as shown in FIG. 4, N1 denotes a first node, N2 denotes a second node, N3 denotes a third node, and N4 denotes a fourth node; UE1 denotes a UE under the coverage of N1, UE2 denotes a UE under the coverage of N2, UE3 denotes a UE under the coverage of N3, and UE4 denotes a UE under the coverage of N4. N2 may be regarded as a child node of N1, and N1 may be regarded as a parent node of N2. Specifically, N1 may be regarded as the source parent node of N2 and N4 may be regarded as the target parent node of N2.

In this example, three reference timing alignment modes are defined, that is, a first reference timing alignment mode, a second reference timing alignment mode, and a hybrid reference timing alignment mode. The characteristics of these three reference timing alignment modes are described below.

The first reference timing alignment mode includes at least one of: in a case where the first timing mode and the second timing mode are performed in parallel, determining a reference timing between nodes according to a reference timing of the first timing mode, where specifically, the reference timing of the first timing mode may be used as the reference timing between nodes; or in a case where the third timing mode and the second timing mode are performed in parallel, determining a reference timing between nodes according to a reference timing of the third timing mode, where specifically, the reference timing of the third timing mode may be used as the reference timing between nodes.

The second reference timing alignment mode includes determining a reference timing between nodes according to a time difference between a reference timing of the first node and an uplink reception timing and a time difference between a reference timing of the second node and a downlink reception timing.

The hybrid reference timing alignment mode includes: adopting the first reference timing alignment mode from a first reference timing alignment to an N-th reference timing alignment, and adopting the second reference timing alignment mode after the N-th reference timing alignment; where N is an integer greater than or equal to 1.

Sub-Example One of Example Two: Predefining a Reference Timing Alignment Mode Any one of the first reference timing alignment mode, the second reference timing alignment mode, or the hybrid reference timing alignment mode is predefined as the reference timing alignment mode.

For example, N1 and N2 predefine the first reference timing alignment mode as the reference timing alignment mode.

For example, N1 and N2 predefine the second reference timing alignment mode as the reference timing alignment mode.

Sub-Example Two of Example Two: Configuring a Reference Timing Alignment Mode N1 configures second signaling for N2. N2 receives the second signaling and determines a reference timing alignment mode according to the second signaling. The second signaling is configured for N2 in a manner of wireless air interface signaling or in a manner of OAM. The wireless air interface signaling includes at least one of: higher-layer signaling, MAC signaling, or physical layer signaling.

It is assumed that the second signaling corresponds to B bits, and any Y of the $2^B$ (B-th power of 2) binary states represent one or more of the first reference timing alignment mode, the second reference timing alignment mode, and the hybrid reference timing alignment mode, respectively.

For example, B=1, and the corresponding two binary states represent the first reference timing alignment mode and the second reference timing alignment mode, respectively.

For example, B =2, and any two of the corresponding four binary states represent the first reference timing alignment mode and the second reference timing alignment mode, respectively.

The remaining one binary state represents a hybrid reference timing alignment mode of the first reference timing alignment mode and the second reference timing alignment mode. Optionally, the first reference timing alignment mode is adopted for the first reference timing alignment, and the second reference timing alignment mode is adopted after the first reference timing alignment.

Sub-Example Three of Example Two: a Node Reporting a Reference Timing Alignment Mode or a Reference Timing Alignment Mode-Related Capability N2 reports the reference timing alignment mode capability of N2 to N1, and N1 determines the reference timing alignment mode according to the reference timing alignment mode capability supported by N2.

For example, N2 does not have the first timing mode capability or the third timing mode capability, and then the second reference timing alignment mode is determined as the reference timing alignment mode; or N2 has the first timing mode capability or the third timing mode capability, and then the first reference timing alignment mode is determined as the reference timing alignment mode.

EXAMPLE THREE

Determining a TA Configuration Mode

In the example, as shown in FIG. 4, N1 denotes a first node, N2 denotes a second node, N3 denotes a third node, and N4 denotes a fourth node; UE1 denotes a UE under the coverage of N1, UE2 denotes a UE under the coverage of N2, UE3 denotes a UE under the coverage of N3, and UE4 denotes a UE under the coverage of N4. N2 may be regarded as a child node of N1, and N1 may be regarded as a parent node of N2. Specifically, N1 may be regarded as the source parent node of N2 and N4 may be regarded as the target parent node of N2.

In this example, four TA configuration modes are defined, that is, a first TA configuration mode, a second TA configuration mode, a third TA configuration mode, and a compatibility mode. The characteristics of these four TA configuration modes are described below.

The first TA configuration mode includes configuring an absolute negative TA.

The second TA configuration mode includes configuring a relative negative TA.

The third TA configuration mode includes a symbol alignment for positive TA.

The compatibility mode includes that the first node configures a positive TA and that the first node schedules the second node in a non-slot manner.

Sub-Example One of Example Three: Predefining a TA Configuration Mode

Any one of the first TA configuration mode, the second TA configuration mode, the third TA configuration mode, or the compatibility mode is predefined as the TA configuration mode.

For example, N1 and N2 predefine the first TA configuration mode as the TA configuration mode.

For example, N1 and N2 predefine the second TA configuration mode as the TA configuration mode.

For example, N1 and N2 predefine the third TA configuration mode as the TA configuration mode.

Sub-Example Two of Example Three: Configuring a TA Configuration Mode

N1 configures third signaling for N2. N2 receives the third signaling and determines a TA configuration mode according to the third signaling. The third signaling is configured for N2 in a manner of wireless air interface signaling or in a manner of OAM. The wireless air interface signaling includes at least one of: higher-layer signaling, MAC signaling, or physical layer signaling.

It is assumed that the third signaling corresponds to C bits, and any Z of the $2^C$ (C-th power of 2) binary states represent one or more of the first TA configuration mode, the second TA configuration mode, the third TA configuration mode, and the compatibility mode, respectively.

For example, C =2, and any three of the corresponding four binary states represent the first TA configuration mode, the second TA configuration mode, and the third TA configuration mode, respectively.

The remaining one binary state represents the compatibility mode. Optionally, N1 configures a positive TA, and N1 schedules N2 in a non-slot (or mini-slot) manner.

Sub-Example Three of Example Three: a Node Reporting a TA Configuration Mode Capability or a TA Configuration Mode-Related Capability N2 reports the TA configuration mode capability of N2 to N1, and N1 determines the TA configuration mode according to the TA configuration mode capability supported by N2.

For example, N2 does not have a negative TA capability, and then the third TA configuration mode is determined as the TA configuration mode; or N2 has a negative TA capability, and then the first TA configuration mode or the second TA configuration mode is determined as the TA configuration mode.

EXAMPLE FOUR

Absolute Negative TA (First TA Configuration Mode)

In the example, as shown in FIG. 4, N1 denotes a first node, N2 denotes a second node, N3 denotes a third node, and N4 denotes a fourth node; UE1 denotes a UE under the coverage of N1, UE2 denotes a UE under the coverage of N2, UE3 denotes a UE under the coverage of N3, and UE4 denotes a UE under the coverage of N4. N2 may be regarded as a child node of N1, and N1 may be regarded as a parent node of N2. Specifically, N1 may be regarded as the source parent node of N2 and N4 may be regarded as the target parent node of N2.

N1 configures a TA value for N2. N2 receives the TA value and determines an uplink transmission timing of N2 according to the TA value. The TA value being greater than zero indicates that an uplink transmission timing of N2 is advanced relative to a downlink reception timing of N2, the TA value being less than zero indicates that the uplink transmission timing of N2 is delayed relative to the downlink reception timing of N2, and the TA value being equal to zero indicates that the uplink transmission timing of N2 is aligned with the downlink reception timing of N2. The TA is determined by the PD, PD (n) denotes the propagation delay of the (n)-th hop link, PD (n+1) denotes the propagation delay of the (n+1)-th hop link, where n≥0.

Sub-Example One of Example Four

N1 determines the attribute of the TA value and the TA value according to the timing mode and/or the propagation delay of the hop link, and N1 configures the TA value for N2. Alternatively, both N1 and N2 determine the attribute of the TA value and the TA value according to the timing mode and/or the propagation delay of the hop link. Specifically, the step in which the attribute of the TA value and the TA value are determined according to the timing mode and/or the propagation delay of the hop link includes the features described below.

In the first timing mode:
PD (0)=0 and TA (0)=0 for the 0-th hop link;
the TA value of the first hop link is greater than or equal to 0, and TA (1)=2*PD (1); and
the TA value of the (n)-th hop link is greater than or equal to 0, and TA (n)=2*PD (n).

In the second timing mode:
PD (0)=0 and TA (0)=0 for the 0-th hop link;
the TA value of the first hop link is greater than or equal to 0, and TA (1)=PD (1); and
the TA value of the (n)-th hop link is greater than or equal to 0, and TA (n)=PD (n).

In the third timing mode:
PD (0)=0 and TA (0)=0 for the 0-th hop link;
the TA value of the first hop link is greater than or equal to 0, and TA (1)=2*PD (1);
when PD (n−1)≤2*PD (n), the TA value of the (n)-th hop link is greater than or equal to 0, and TA (n)=2*PD (n)−PD (n−1); and
when PD (n−1)≥2*PD (n), the TA value of the (n)-th hop link is less than or equal to 0, and TA (n)=−(PD (n−1)−2*PD (n)).

Sub-Example Two of Example Four: Configuring One TA which is Indicated in an Explicit Manner N1 configures one TA for N2, and N2 determines the attribute of the TA value according to indication information bits.

It is assumed that the original TA value corresponds to D bits, that is, D bits are used for indicating the TA value in the original TAC.

In this example, one bit is added to indicate the attribute of the TA value, and then, among the (D+1) bits, the D bits indicating the TA value in the original TAC is still used for indicating the numerical value of the TA value, and the newly added one bit indicates the attribute of the TA value. For example, "0" indicates that the TA value is greater than or equal to zero, and "1" indicates that the TA value is less than or equal to zero; or "1" indicates that the TA value is greater than or equal to zero, and "0" indicates that the TA value is less than or equal to zero.

Alternatively, among the D bits indicating the TA value in the original TAC, any one bit indicates the attribute of the TA value. For example, "0" indicates that the TA value is greater than or equal to zero, and "1" indicates that the TA value is less than or equal to zero; or "1" indicates that the TA value is greater than or equal to zero, and "0" indicates that the TA value is less than or equal to zero. The remaining (D−1) bits indicate the numerical value of the TA value.

Sub-Example Three of Example Four: Configuring One TA which is Determined According to a Bit Interval N1 configures one TA value for N2, and N2 determines the attribute of the TA value according to the binary bit interval corresponding to the TA value.

It is assumed that the original interval of the TA value corresponds to D bits, that is, D bits in the original TAC are used for indicating the TA value.

The binary bit interval indicated by the D bits is {B}={B1}∪{B2}, the first sub-interval {B1} in interval {B} indicates that the TA value is greater than or equal to 0, and the second sub-interval {B2} indicates that the TA value is less than or equal to 0.

For example, D=3, the binary bit interval {B}={000, 001, 010, 011, 100, 101, 110, 111}, {B} is divided into two sub-intervals {B1} and {B2}, {B1}={000, 001, 010, 011}, {B2}={100, 101, 110, 111}, {B1} indicates that the TA value is greater than or equal to 0, and {B2} indicates that the TA value is less than or equal to 0.

EXAMPLE FIVE

Relative Negative TA (Second TA Configuration Mode)

In the example, as shown in FIG. 4, N1 denotes a first node, N2 denotes a second node, N3 denotes a third node, and N4 denotes a fourth node; UE1 denotes a UE under the coverage of N1, UE2 denotes a UE under the coverage of N2, UE3 denotes a UE under the coverage of N3, and UE4 denotes a UE under the coverage of N4. N2 may be regarded as a child node of N1, and N1 may be regarded as a parent node of N2. Specifically, N1 may be regarded as the source parent node of N2 and N4 may be regarded as the target parent node of N2.

N1 configures an Offset relative to a TA value at a specific time for N2. N2 receives the Offset and determines an uplink transmission timing of N2 according to the TA value and the Offset. The value of (TA+Offset) being greater than zero indicates that the uplink transmission timing of N2 may be advanced relative to a downlink reception timing of N2, the value of (TA+Offset) being less than zero indicates that the uplink transmission timing of N2 may be delayed relative to the downlink reception timing of N2, and the value of (TA+Offset) being equal to zero indicates that the uplink transmission timing of N2 may be aligned with the downlink reception timing of N2.

A time granularity corresponding to the Offset may be different from a time granularity corresponding to the TA.

The Offset is configured for N2 in a manner of wireless air interface signaling or in a manner of OAM. The wireless air interface signaling includes at least one of: higher-layer signaling, MAC signaling, or physical layer signaling.

Sub-Example One of Example Five: Indication Through Independent Signaling

N1 configures one Offset relative to the latest TA for N2, and the Offset corresponds to specific signaling, that is, independent of TAC in RAR or independent of TAC in MAC.

Sub-Example Two of Example Five: Indication by being Nested with a TAC

N1 configures one Offset relative to the latest TA for N2, and the Offset has a nested relationship with the TAC in RAR or TAC in MAC.

It is assumed that the original interval of the TA value corresponds to D bits, the decimal bit interval indicated by the D bits is {D1}, the first sub-interval {D1} indicates the TA value, {D1} is extended to {D}, {D}={D1}∪{D2}, and the second sub-interval {D2} indicates the Offset relative to the latest TA.

For example, D=12, the decimal interval {D1}={0, 1, 2, . . . , 3846}, {D1} is extended to {D}, {D}={D1}∪{D2}, and {D}={0, 1, 2, . . . , 3846, 3847, 3848, 3849, . . . 7692}. {D2}={3847, 3848, 3849, . . . , 7692} which indicates the Offset relative to the latest TA.

For example, D=6, the decimal interval {D1}={0, 1, 2, . . . , 63}, {D1} is extended to {D}, {D}={D1}∪{D2}, and {D}={0, 1, 2, . . . , 63, 64, 65, 66, . . . , 127}. {D2}={64, 65, 66, . . . , 127} which indicates the Offset relative to the latest TA.

EXAMPLE SIX

Symbol Alignment for Positive TA (Third TA Configuration Mode)

Sub-Example One of Example Six: Aligning Symbols for Simultaneous Transmission The uplink transmission link of N2 is aligned with the downlink transmission link of N2 after several OFDM symbols as an offset are advanced or delayed. The time length of one offset OFDM is determined by the maximum value, min(SCS_UL_Tx, SCS_DL_Tx). SCS_UL_Tx denotes subcarrier spacing corresponding to an uplink transmission link of N2, and SCS_DL_Tx denotes subcarrier spacing corresponding to a downlink transmission link of N2. The number of offset OFDM symbols is determined in a manner of predefinition or configuration.

Sub-Example Two of Example Six: Aligning Symbols for Simultaneous Reception

The uplink reception link of N2 is aligned with the downlink reception link of N2 after several OFDM symbols as an offset are advanced or delayed. The time length of one offset OFDM is determined by the maximum value, min (SCS_UL_Rx, SCS_DL_Rx). SCS_UL_Rx denotes subcarrier spacing corresponding to an uplink reception link of N2, and SCS_DL_Rx denotes subcarrier spacing corresponding to a downlink reception link of N2. The number of offset OFDM symbols is determined in a manner of predefinition or configuration.

Figure 5:
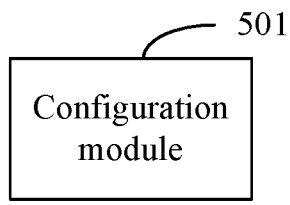
FIG. 5 is a structure diagram of a timing information configuration apparatus according to another embodiment of the present disclosure.

Referring to FIG. 5, another embodiment of the present disclosure provides a timing information configuration apparatus (such as a first node). The apparatus includes a configuration module 501.

The configuration module 501 is configured to predefine or configure timing information of a second node. The timing information includes at least one of: a timing mode, a reference timing alignment mode, a TA configuration mode, a TA value, an offset of a TA value, a number of OFDM symbols that an uplink transmission link is advanced or delayed relative to a downlink transmission link for alignment, or a number of OFDM symbols that an uplink reception link is advanced or delayed relative to a downlink reception link for alignment.

In the embodiment of the present disclosure, the timing mode includes at least one of a first timing mode, a second timing mode, a third timing mode, or a hybrid timing mode.

In the embodiment of the present disclosure, the first timing mode includes that a reference timing of each node is aligned with a reference timing of a donor node.

The second timing mode includes that a reference timing of each node is aligned with a reference timing of a donor node and that an uplink transmission timing of the each node is aligned with the reference timing of the each node.

The third timing mode includes that a reference timing of each node is aligned with a reference timing of a donor node and that an uplink reception timing of the each node is aligned with a downlink reception timing of the each node.

In the embodiment of the present disclosure, the hybrid timing mode includes at least one of the modes described below.

A timing mode of the second node in a first slot is the second timing mode and a timing mode of the second node in a second slot is the third timing mode; where a remainder obtained after a slot index of the first slot is divided by 2 is a first value, a remainder obtained after a slot index of the second slot is divided by 2 is a second value, and the first value and the second value are different and are each either 0 or 1.

A timing mode of the second node in a third slot is the first timing mode, a timing mode of the second node in a fourth slot is the second timing mode, and a timing mode of the second node in a fifth slot is the third timing mode; where a remainder obtained after a slot index of the third slot is divided by 3 is a third value, a remainder obtained after a slot index of the fourth slot is divided by 3 is a fourth value, a remainder obtained after a slot index of the fifth slot is divided by 3 is a fifth value, and the third value, the fourth value, and the fifth value are different and are each any one of 0, 1, or 2.

A timing mode of simultaneous transmission and a timing mode of simultaneous reception are simultaneously supported.

In the embodiment of the present disclosure, the configuration module 501 is specifically configured to implement predefinition of the timing mode of the second node in the manner described below.

Any one of the first timing mode, the second timing mode, the third timing node, or the hybrid timing mode is predefined as the timing mode of the second node.

In the embodiment of the present disclosure, the configuration module 501 is specifically configured to implement predefinition of the timing mode of the second node in at least one of the manners described below.

In a case where a time division multiplexing manner is adopted for all hop links including a link between a first node and the second node, the first timing mode is predefined as the timing mode of the second node.

In a case where a spatial division multiplexing manner or a frequency division multiplexing manner is adopted for all hop links including a link between a first node and the second node and a simultaneous transmission mechanism is adopted for an uplink transmission of the second node and a downlink transmission of the second node, the second timing mode is predefined as the timing mode of the second node.

In a case where a spatial division multiplexing manner or a frequency division multiplexing manner is adopted for all hop links including a link between a first node and the second node and a simultaneous reception mechanism is adopted for an uplink reception of the second node and a downlink reception of the second node, the third timing mode is predefined as the timing mode of the second node.

In the embodiment of the present disclosure, the configuration module 501 is specifically configured to implement predefinition of the timing mode of the second node in at least one of the manners described below.

The first timing mode is predefined as a timing mode of the second node within a first time resource.

The second timing mode is predefined as a timing mode of the second node within a second time resource.

The third timing mode is predefined as a timing mode of the second node within a third time resource.

In the embodiment of the present disclosure, the first time resource is a slot corresponding to a third value which is a remainder obtained after a slot index is divided by 3.

The second time resource is a slot corresponding to a fourth value which is a remainder obtained after a slot index is divided by 3.

The third time resource is a slot corresponding to a fifth value which is a remainder obtained after a slot index is divided by 3.

The third value, the fourth value, and the fifth value are different and are each any one of 0, 1, or 2.

In the embodiment of the present disclosure, the configuration module 501 is specifically configured to implement configuration of the timing mode of the second node in the manner described below.

The timing mode of the second node is configured according to a timing mode capability reported by the second node.

In the embodiment of the present disclosure, the configuration module 501 is specifically configured to implement configuration of the timing mode of the second node according to the timing mode capability reported by the second node in at least one of the manners described below.

In a case where the timing mode capability reported by the second node is that the second node has a first capability, the second timing mode is configured as the timing mode of the second node; where the first capability includes any one of the following: the second node supports the second timing mode; or the second node has a capability of simultaneous transmission of an uplink transmission and a downlink transmission.

In a case where the timing mode capability reported by the second node is that the second node does not have a first capability, the first timing mode or the third timing mode is configured as the timing mode of the second node.

In a case where the timing mode capability reported by the second node is that the second node has a second capability, the third timing mode is configured as the timing mode of the second node; where the second capability includes any one of the following: the second node supports the third timing mode; or the second node has a capability of simultaneous reception of an uplink reception and a downlink reception.

In a case where the timing mode capability reported by the second node is that the second node does not have a second capability, the first timing mode or the second timing mode is configured as the timing mode of the second node.

In a case where the timing mode capability reported by the second node is that the second node has a third capability, the hybrid timing mode is configured as the timing mode of the second node; where the third capability includes any one of the following: the second node supports the hybrid timing mode; or the second node supports a timing mode of simultaneous transmission of an uplink transmission and a downlink transmission and a timing mode of simultaneous reception of an uplink reception and a downlink reception.

In a case where the timing mode capability reported by the second node is that the second node does not have a third capability, the first timing mode is configured as the timing mode of the second node.

In the embodiment of the present disclosure, the configuration module 501 is specifically configured to implement configuration of the timing mode of the second node in the manner described below.

The timing mode of the second node is configured in a manner of first signaling.

Alternatively, the timing mode of the second node is configured in a manner of OAM.

In the embodiment of the present disclosure, the first signaling includes wireless air interface signaling, and the wireless air interface signaling includes at least one of: higher-layer signaling, media access control (MAC) signaling, or physical layer signaling.

In the embodiment of the present disclosure, any one of the first timing mode, the second timing mode, the third timing mode, or the hybrid timing mode is represented by any X binary states among $2^A$ binary states represented by A bits in the first signaling; where A and X are each an integer greater than or equal to 1.

In the embodiment of the present disclosure, the reference timing alignment mode is a reference timing alignment mode in a case where the timing mode is the second timing mode.

In the embodiment of the present disclosure, the reference timing alignment mode includes at least one of: a first reference timing alignment mode, a second reference timing alignment mode, or a hybrid reference timing alignment mode.

In the embodiment of the present disclosure, the first reference timing alignment mode includes at least one of: in a case where the first timing mode and the second timing mode are performed in parallel, determining a reference timing between nodes according to a reference timing of the first timing mode; or in a case where the third timing mode and the second timing mode are performed in parallel, determining a reference timing between nodes according to a reference timing of the third timing mode.

The second reference timing alignment mode includes determining a reference timing between nodes according to a time difference between a reference timing of the first node and an uplink reception timing and a time difference between a reference timing of the second node and a downlink reception timing.

In the embodiment of the present disclosure, the hybrid reference timing alignment mode includes: adopting the first reference timing alignment mode from a first reference timing alignment to an N-th reference timing alignment, and adopting the second reference timing alignment mode after the N-th reference timing alignment; where N is an integer greater than or equal to 1.

In the embodiment of the present disclosure, the configuration module 501 is specifically configured to implement predefinition of the reference timing alignment mode of the second node in the manner described below.

Any one of the first reference timing alignment mode, second reference timing alignment mode, or the hybrid reference timing alignment mode is predefined as the reference timing alignment mode of the second node.

In the embodiment of the present disclosure, the configuration module 501 is specifically configured to implement configuration of the reference timing alignment mode of the second node in the manner described below.

The reference timing alignment mode of the second node is configured in a manner of second signaling.

Alternatively, the reference timing alignment mode of the second node is configured in a manner of OAM.

In the embodiment of the present disclosure, the second signaling includes wireless air interface signaling, and the wireless air interface signaling includes at least one of: higher-layer signaling, media access control (MAC) signaling, or physical layer signaling.

In the embodiment of the present disclosure, any one of the first reference timing alignment mode, the second reference timing alignment mode, or the hybrid reference timing alignment mode is represented by any Y binary states among $2^B$ binary states represented by B bits in the second signaling; where B and Y are each an integer greater than or equal to 1.

In the embodiment of the present disclosure, the configuration module 501 is specifically configured to implement configuration of the reference timing alignment mode of the second node in the manner described below.

The reference timing alignment mode of the second node is configured according to a reference timing alignment mode capability reported by the second node.

In the embodiment of the present disclosure, the configuration module 501 is specifically configured to implement configuration of the reference timing alignment mode of the second node according to the reference timing alignment mode capability reported by the second node in at least one of the manners described below.

In a case where the reference timing alignment mode capability reported by the second node is that the second node does not support the first timing mode or the third timing mode, the second reference timing alignment mode is configured as the reference timing alignment mode of the second node.

In a case where the reference timing alignment mode capability reported by the second node is that the second node supports the first timing mode or the third timing mode, the first reference timing alignment mode is configured as the reference timing alignment mode of the second node.

In the embodiment of the present disclosure, the TA configuration mode is a TA configuration mode in a case where the timing mode is the third timing mode.

In the embodiment of the present disclosure, the TA configuration mode includes at least one of a first TA configuration mode, a second TA configuration mode, a third TA configuration mode, or a compatibility mode.

In the embodiment of the present disclosure, the first TA configuration mode includes configuring an absolute negative TA.

The second TA configuration mode includes configuring a relative negative TA.

The third TA configuration mode includes a symbol alignment for positive TA.

In the embodiment of the present disclosure, the compatibility mode includes that the first node configures a positive TA and that the first node schedules the second node in a non-slot manner.

In the embodiment of the present disclosure, the configuration module 501 is specifically configured to implement predefinition of the TA configuration mode in the manner described below.

Any one of the first TA configuration mode, the second TA configuration mode, the third TA configuration mode, or the compatibility mode is predefined as the TA configuration mode.

In the embodiment of the present disclosure, the configuration module 501 is specifically configured to implement configuration of the TA configuration mode of the second node in the manner described below.

The TA configuration mode of the second node is configured in a manner of third signaling.

Alternatively, the TA configuration mode of the second node is configured in a manner of OAM.

In the embodiment of the present disclosure, the third signaling includes wireless air interface signaling, and the wireless air interface signaling includes at least one of: higher-layer signaling, media access control (MAC) signaling, or physical layer signaling.

In the embodiment of the present disclosure, any one of the first TA configuration mode, the second TA configuration mode, the third TA configuration mode, or the compatibility mode is represented by any Z binary states among $2^C$ binary states represented by C bits in the third signaling; where C and Z are each an integer greater than or equal to 1.

In the embodiment of the present disclosure, the configuration module 501 is specifically configured to implement configuration of the TA configuration mode of the second node in the manner described below.

The TA configuration mode of the second node is configured according to a TA configuration mode capability reported by the second node.

In the embodiment of the present disclosure, the configuration module 501 is specifically configured to implement configuration of the TA configuration mode of the second node according to the TA configuration mode capability reported by the second node in at least one of the manners described below.

In a case where the TA configuration mode capability reported by the second node is that the second node does not have a negative TA capability, the third TA configuration mode or the compatibility mode is configured as the TA configuration mode of the second node.

In a case where the TA configuration mode capability reported by the second node is that the second node has a negative TA capability, the first TA configuration mode or the second TA configuration mode is configured as the TA configuration mode of the second node.

In the embodiment of the present disclosure, the TA value is an absolute TA value, the TA value being greater than zero indicates that an uplink transmission timing of the second node is advanced relative to a downlink reception timing of the second node, the TA value being less than zero indicates that the uplink transmission timing of the second node is delayed relative to the downlink reception timing of the second node, and the TA value being equal to zero indicates that the uplink transmission timing of the second node is aligned with the downlink reception timing of the second node.

In the embodiment of the present disclosure, the step of determining the TA value includes at least one of the cases described below.

In a case where the timing mode is the first timing mode, it is determined that an attribute of a TA value of a 0-th hop link is equal to 0.

In a case where the timing mode is the first timing mode, it is determined that an attribute of a TA value of an i-th hop link is greater than or equal to 0, and the TA value of the i-th hop link is 2PD(i); where PD(i) is the propagation delay of the i-th hop link.

In a case where the timing mode is the second timing mode, it is determined that an attribute of a TA value of a 0-th hop link is equal to 0.

In a case where the timing mode is the second timing mode, it is determined that an attribute of a TA value of an i-th hop link is greater than or equal to 0, and the TA value of the i-th hop link is PD(i); where PD(i) is the propagation delay of the i-th hop link.

In a case where the timing mode is the third timing mode, it is determined that an attribute of a TA value of a 0-th hop link is equal to 0.

In a case where the timing mode is the third timing mode, it is determined that an attribute of a TA value of a first hop link is greater than or equal to 0, and the TA value of the i-th hop link is 2PD(i); where PD(i) is the propagation delay of the i-th hop link.

In a case where the timing mode is the third timing mode and PD(i−1) is less than or equal to 2PD(i), it is determined that an attribute of a TA value of an i-th hop link is greater than or equal to 0, and the TA value of the i-th hop link is 2PD(i)−PD(i−1); where PD(i) is the propagation delay of the i-th hop link.

In a case where the timing mode is the third timing mode and PD(i−1) is greater than or equal to 2PD (i), it is determined that an attribute of a TA value of an i-th hop link is less than or equal to 0, and the TA value of the i-th hop link is −(PD(i−1)−2PD(i)).

In the embodiment of the present disclosure, the configuration module 501 is specifically configured to implement configuration of the TA value of the second node in a following included manner: the TA value of the second node is configured through indication information bits.

In the embodiment of the present disclosure, the indication information bits comprise (D+1) bits, where D bits indicate a numerical value of the TA value and 1 bit indicates an attribute of the TA value; where D is an integer greater than or equal to 1.

In the embodiment of the present disclosure, the method includes at least one of the cases described below.

In a case where a bit interval corresponding to the TA value is a first sub-interval, an attribute of the TA value is greater than or equal to 0.

In a case where a bit interval corresponding to the TA value is a second sub-interval, an attribute of the TA value is less than or equal to 0.

An union of the first sub-interval and the second sub-interval is a TA value interval in a timing advance command (TAC).

In the embodiment of the present disclosure, the offset of the TA value is an offset relative to a TA value at a specific time, the value of (TA+Offset) being greater than zero indicates that an uplink transmission timing of the second node is advanced relative to a downlink reception timing of the second node, the value of (TA+Offset) being less than zero indicates that the uplink transmission timing of the second node is delayed relative to the downlink reception timing of the second node, and the value of (TA+Offset) being equal to zero indicates that the uplink transmission timing of the second node is aligned with the downlink reception timing of the second node, where Offset is the offset of the TA value.

In the embodiment of the present disclosure, a time granularity corresponding to the Offset is different from a time granularity corresponding to the TA value.

In the embodiment of the present disclosure, the offset of the TA value is an offset relative to a latest TA value.

The offset is independent of a TAC in a random access response (RAR) or independent of a TAC in a media access control control element (MAC CE); or the offset has a nested relationship with a TAC in an RAR or a TAC in a MAC CE.

In the embodiment of the present disclosure, the offset having the nested relationship with the TAC in the RAR or the TAC in the MAC CE includes extending a TA value interval in the TAC in the MAC CE or in the TAC in the RAR into a union of a third sub-interval and a fourth sub-interval; where the third sub-interval indicates a TA value in the TAC in the MAC CE or in the TAC in the RAR, and the fourth sub-interval indicates the offset of the TA value.

In the embodiment of the present disclosure, the configuration module 501 is specifically configured to implement configuration of the offset of the TA value of the second node in the manner described below.

The offset of the TA value of the second node is configured in a manner of fourth signaling.

Alternatively, the offset of the TA value of the second node is configured in a manner of OAM.

In the embodiment of the present disclosure, a time length of OFDM symbols is determined according to any one of: min (SCS_UL_Tx, SCS_DL_Tx)or min (SCS_UL_Rx, SCS_DL_Rx).

SCS_UL_Tx is subcarrier spacing corresponding to an uplink transmission link of the second node, SC_S_DL_Tx is subcarrier spacing corresponding to a downlink transmission link of the second node, SCS_UL_Rx is subcarrier spacing corresponding to an uplink reception link of the second node, and SCS_DL_Rx is subcarrier spacing corresponding to a downlink reception link of the second node.

The specific implementation process of the timing information configuration apparatus described above is the same as the specific implementation process of the timing information configuration method described in the previous embodiment, and details will not be repeated here.

Figure 6:
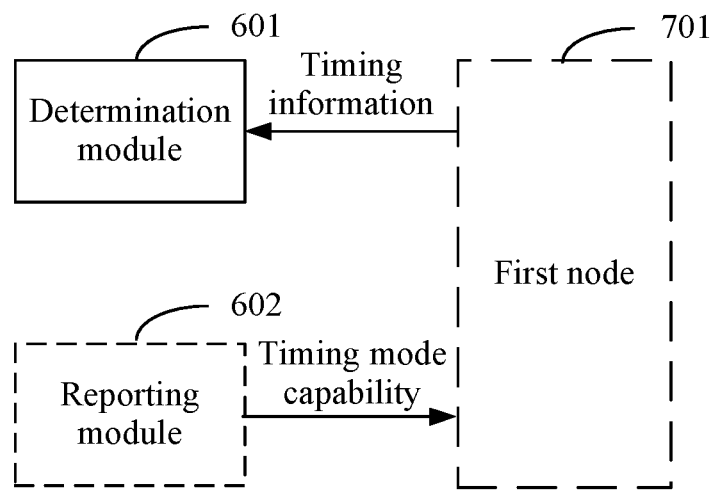
FIG. 6 is a structure diagram of a timing information configuration apparatus according to another embodiment of the present disclosure.

Referring to FIG. 6, another embodiment of the present disclosure provides a timing information configuration apparatus (such as a second node). The apparatus includes a determination module 601.

The determination module 601 is configured to determine timing information in a manner of predefinition or in a manner of being configured. The timing information includes at least one of: a timing mode, a reference timing alignment mode, a TA configuration mode, a TA value, an offset of a TA value, a number of OFDM symbols that an uplink transmission link is advanced or delayed relative to a downlink transmission link for alignment, or a number of OFDM symbols that an uplink reception link is advanced or delayed relative to a downlink reception link for alignment.

In the embodiment of the present disclosure, the timing mode includes at least one of a first timing mode, a second timing mode, a third timing mode, or a hybrid timing mode.

In the embodiment of the present disclosure, the first timing mode includes that a reference timing of each node is aligned with a reference timing of a donor node.

The second timing mode includes that a reference timing of each node is aligned with a reference timing of a donor node and that an uplink transmission timing of the each node is aligned with the reference timing of the each node.

The third timing mode includes that a reference timing of each node is aligned with a reference timing of a donor node and that an uplink reception timing of the each node is aligned with a downlink reception timing of the each node.

In the embodiment of the present disclosure, the hybrid timing mode includes at least one of the modes described below.

A timing mode of the second node in a first slot is the second timing mode and a timing mode of the second node in a second slot is the third timing mode; where a remainder obtained after a slot index of the first slot is divided by 2 is a first value, a remainder obtained after a slot index of the second slot is divided by 2 is a second value, and the first value and the second value are different and are each either 0 or 1.

A timing mode of the second node in a third slot is the first timing mode, a timing mode of the second node in a fourth slot is the second timing mode, and a timing mode of the second node in a fifth slot is the third timing mode; where a remainder obtained after a slot index of the third slot is divided by 3 is a third value, a remainder obtained after a slot index of the fourth slot is divided by 3 is a fourth value, a remainder obtained after a slot index of the fifth slot is divided by 3 is a fifth value, and the third value, the fourth value, and the fifth value are different and are each any one of 0, 1, or 2.

A timing mode of simultaneous transmission and a timing mode of simultaneous reception are simultaneously supported.

In the embodiment of the present disclosure, the determination module 601 is specifically configured to implement determination of the timing mode in the manner of predefinition in a manner described below.

Any one of the first timing mode, the second timing mode, the third timing node, or the hybrid timing mode is predefined as the timing mode.

In the embodiment of the present disclosure, the determination module 601 is specifically configured to implement determination of the timing mode in the manner of predefinition in at least one of the manners described below.

In a case where a time division multiplexing manner is adopted for all hop links including a link between a first node and the second node, the first timing mode is predefined as the timing mode.

In a case where a spatial division multiplexing manner or a frequency division multiplexing manner is adopted for all hop links including a link between a first node and the second node and a simultaneous transmission mechanism is adopted for an uplink transmission of the second node and a downlink transmission of the second node, the second timing mode is predefined as the timing mode.

In a case where a spatial division multiplexing manner or a frequency division multiplexing manner is adopted for all hop links including a link between a first node and the second node and a simultaneous reception mechanism is adopted for an uplink reception of the second node and a downlink reception of the second node, the third timing mode is predefined as the timing mode.

In the embodiment of the present disclosure, the determination module 601 is specifically configured to implement determination of the timing mode in the manner of predefinition in at least one of the manners described below.

The first timing mode is predefined as a timing mode within a first time resource.

The second timing mode is predefined as a timing mode within a second time resource.

The third timing mode is predefined as a timing mode within a third time resource.

In the embodiment of the present disclosure, the first time resource is a slot corresponding to a third value which is a remainder obtained after a slot index is divided by 3.

The second time resource is a slot corresponding to a fourth value which is a remainder obtained after a slot index is divided by 3.

The third time resource is a slot corresponding to a fifth value which is a remainder obtained after a slot index is divided by 3.

The third value, the fourth value, and the fifth value are different and are each any one of 0, 1, or 2.

In the embodiment of the present disclosure, the apparatus further includes a reporting module 602 configured to report a timing mode capability of the second node.

In the embodiment of the present disclosure, the determination module 601 is specifically configured to implement determination of the timing mode in the manner of being configured in a manner described below.

First signaling is received and the timing mode of the second node is determined according to the first signaling.

Alternatively, the timing mode is determined in the manner of OAM.

In the embodiment of the present disclosure, the first signaling includes wireless air interface signaling, and the wireless air interface signaling includes at least one of: higher-layer signaling, media access control (MAC) signaling, or physical layer signaling.

In the embodiment of the present disclosure, any one of the first timing mode, the second timing mode, the third timing mode, or the hybrid timing mode is represented by any X binary states among $2^A$ binary states represented by A bits in the first signaling; where A and X are each an integer greater than or equal to 1.

In the embodiment of the present disclosure, the reference timing alignment mode is a reference timing alignment mode in a case where the timing mode is the second timing mode.

In the embodiment of the present disclosure, the reference timing alignment mode includes at least one of: a first reference timing alignment mode, a second reference timing alignment mode, or a hybrid reference timing alignment mode.

In the embodiment of the present disclosure, the first reference timing alignment mode includes at least one of: in a case where the first timing mode and the second timing mode are performed in parallel, determining a reference timing between nodes according to a reference timing of the first timing mode; or in a case where the third timing mode and the second timing mode are performed in parallel, determining a reference timing between nodes according to a reference timing of the third timing mode.

The second reference timing alignment mode includes determining a reference timing between nodes according to a time difference between a reference timing of the first node and an uplink reception timing and a time difference between a reference timing of the second node and a downlink reception timing.

In the embodiment of the present disclosure, the hybrid reference timing alignment mode includes: adopting the first reference timing alignment mode from a first reference timing alignment to an N-th reference timing alignment, and adopting the second reference timing alignment mode after the N-th reference timing alignment; where N is an integer greater than or equal to 1.

In the embodiment of the present disclosure, the determination module 601 is specifically configured to implement determination of the reference timing alignment mode of the second node in the manner of predefinition in the manner described below.

Any one of the first reference timing alignment mode, the second reference timing alignment mode, or the hybrid reference timing alignment mode is predefined as the reference timing alignment mode of the second node.

In the embodiment of the present disclosure, the determination module 601 is specifically configured to implement determination of the reference timing alignment mode of the second node in the manner of being configured in the manner described below.

Second signaling is received and the reference timing alignment mode of the second node is determined according to the second signaling.

Alternatively, the reference timing alignment mode of the second node is determined in a manner of OAM.

In the embodiment of the present disclosure, the second signaling includes wireless air interface signaling, and the wireless air interface signaling includes at least one of: higher-layer signaling, media access control (MAC) signaling, or physical layer signaling.

In the embodiment of the present disclosure, any one of the first reference timing alignment mode, the second reference timing alignment mode, or the hybrid reference timing alignment mode is represented by any Y binary states among $2^B$ binary states represented by B bits in the second signaling; where B and Y are each an integer greater than or equal to 1.

In the embodiment of the present disclosure, the apparatus further includes a reporting module 602 configured to enable the second node to report a reference timing alignment mode capability of the second node.

In the embodiment of the present disclosure, the TA configuration mode is a TA configuration mode in a case where the timing mode is the third timing mode.

In the embodiment of the present disclosure, the TA configuration mode includes at least one of a first TA configuration mode, a second TA configuration mode, a third TA configuration mode, or a compatibility mode.

In the embodiment of the present disclosure, the first TA configuration mode includes configuring an absolute negative TA.

The second TA configuration mode includes configuring a relative negative TA.

The third TA configuration mode includes a symbol alignment for positive TA.

In the embodiment of the present disclosure, the compatibility mode includes that the first node configures a positive TA and that the first node schedules the second node in a non-slot manner.

In the embodiment of the present disclosure, the determination module 601 is specifically configured to implement predefinition of the TA configuration mode in the manner described below.

Any one of the first TA configuration mode, the second TA configuration mode, the third TA configuration mode, or the compatibility mode is predefined as the TA configuration mode.

In the embodiment of the present disclosure, the determination module 601 is specifically configured to implement determination of the TA configuration mode of the second node in the manner of being configured in the manner described below.

Third signaling is received and the TA configuration mode of the second node is determined according to the third signaling.

Alternatively, the TA configuration mode of the second node is determined in a manner of OAM.

In the embodiment of the present disclosure, the third signaling includes wireless air interface signaling, and the wireless air interface signaling includes at least one of: higher-layer signaling, media access control (MAC) signaling, or physical layer signaling.

In the embodiment of the present disclosure, any one of the first TA configuration mode, the second TA configuration mode, the third TA configuration mode, or the compatibility mode is represented by any Z binary states among $2^C$ binary states represented by C bits in the third signaling; where C and Z are each an integer greater than or equal to 1.

In the embodiment of the present disclosure, the apparatus further includes a reporting module 602 configured to enable the second node to report a TA configuration mode capability of the second node.

In the embodiment of the present disclosure, the TA value is an absolute TA value, the TA value being greater than zero indicates that an uplink transmission timing of the second node is advanced relative to a downlink reception timing of the second node, the TA value being less than zero indicates that the uplink transmission timing of the second node is delayed relative to the downlink reception timing of the second node, and the TA value being equal to zero indicates that the uplink transmission timing of the second node is aligned with the downlink reception timing of the second node.

In the embodiment of the present disclosure, the determination module 601 is specifically configured to implement determination of the TA value of the second node in the manner of predefinition in a manner described below.

In a case where the timing mode is the first timing mode, it is determined that an attribute of a TA value of a 0-th hop link is equal to 0.

In a case where the timing mode is the first timing mode, it is determined that an attribute of a TA value of an i-th hop link is greater than or equal to 0, and the TA value of the i-th hop link is 2PD(i); where PD(i) is the propagation delay of the i-th hop link.

In a case where the timing mode is the second timing mode, it is determined that an attribute of a TA value of a 0-th hop link is equal to 0.

In a case where the timing mode is the second timing mode, it is determined that an attribute of a TA value of an i-th hop link is greater than or equal to 0, and the TA value of the i-th hop link is PD(i); where PD(i) is the propagation delay of the i-th hop link.

In a case where the timing mode is the third timing mode, it is determined that an attribute of a TA value of a 0-th hop link is equal to 0.

In a case where the timing mode is the third timing mode, it is determined that an attribute of a TA value of a first hop link is greater than or equal to 0, and the TA value of the i-th hop link is 2PD(i); where PD(i) is the propagation delay of the i-th hop link.

In a case where the timing mode is the third timing mode and PD(i−1) is less than or equal to 2PD(i), it is determined that an attribute of a TA value of an i-th hop link is greater than or equal to 0, and the TA value of the i-th hop link is 2PD(i)−PD(i−1); where PD(i) is the propagation delay of the i-th hop link.

In a case where the timing mode is the third timing mode and PD(i−1) is greater than or equal to 2PD(i), it is determined that an attribute of a TA value of an i-th hop link is less than or equal to 0, and the TA value of the i-th hop link is −(PD(i−1)−2PD(i)).

In the embodiment of the present disclosure, the determination module 601 is specifically configured to implement determination of the TA value of the second node in the manner of being configured in a manner described below.

Indication information bits are received and the TA value of the second node is determined according to the indication information bits.

Alternatively, an attribute of the TA value is determined according to a bit interval corresponding to the configured TA value.

Alternatively, an attribute of the TA value is determined according to the timing mode and the propagation delay of a hop link.

In the embodiment of the present disclosure, the indication information bits comprise (D+1) bits, where D bits indicate a numerical value of the TA value and 1 bit indicates an attribute of the TA value; where D is an integer greater than or equal to 1.

In the embodiment of the present disclosure, the determination module 601 is specifically configured to implement determination of the attribute of the TA value according to the bit interval corresponding to the configured TA value in at least one of the manners described below.

In a case where a bit interval corresponding to the TA value is a first sub-interval, it is determined that an attribute of the TA value is greater than or equal to 0.

In a case where a bit interval corresponding to the TA value is a second sub-interval, it is determined that an attribute of the TA value is less than or equal to 0.

An union of the first sub-interval and the second sub-interval is a TA value interval in a timing advance command (TAC).

In the embodiment of the present disclosure, the offset of the TA value is an offset relative to a TA value at a specific time, the value of (TA+Offset) being greater than zero indicates that an uplink transmission timing of the second node is advanced relative to a downlink reception timing of the second node, the value of (TA+Offset) being less than zero indicates that the uplink transmission timing of the second node is delayed relative to the downlink reception timing of the second node, and the value of (TA+Offset) being equal to zero indicates that the uplink transmission timing of the second node is aligned with the downlink reception timing of the second node, where Offset is the offset of the TA value.

In the embodiment of the present disclosure, a time granularity corresponding to the Offset is different from a time granularity corresponding to the TA value.

In the embodiment of the present disclosure, the offset of the TA value is an offset relative to a latest TA value.

The offset is independent of a TAC in a random access response (RAR) or independent of a TAC in a media access control control element (MAC CE); or the offset has a nested relationship with a TAC in an RAR or a TAC in a MAC CE.

In the embodiment of the present disclosure, the offset having the nested relationship with the TAC in the RAR or the TAC in the MAC CE includes extending a TA value interval in the TAC in the MAC CE or in the TAC in the RAR into a union of a third sub-interval and a fourth sub-interval; where the third sub-interval indicates a TA value in the TAC in the MAC CE or in the TAC in the RAR, and the fourth sub-interval indicates the offset of the TA value.

In the embodiment of the present disclosure, the determination module 601 is specifically configured to implement determination of the offset of the TA value of the second node in the manner of being configured in a manner described below.

Fourth signaling is received and the offset of the TA value of the second node is determined according to the fourth signaling. The fourth signaling includes wireless air interface signaling, and the wireless air interface signaling includes at least one of: higher-layer signaling, media access control (MAC) signaling, or physical layer signaling.

Alternatively, the offset of the TA value of the second node is determined in a manner of OAM.

In the embodiment of the present disclosure, a time length of OFDM symbols is determined according to any one of: min (SCS_UL_Tx, SCS_DL_Tx)or min (SCS_UL_Rx, SCS_DL_Rx).

SCS_UL_Tx is subcarrier spacing corresponding to an uplink transmission link of the second node, SC_S_DL_Tx is subcarrier spacing corresponding to a downlink transmission link of the second node, SCS_UL_Rx is subcarrier spacing corresponding to an uplink reception link of the second node, and SCS_DL_Rx is subcarrier spacing corresponding to a downlink reception link of the second node.

The specific implementation process of the timing information configuration apparatus described above is the same as the specific implementation process of the timing information configuration method described in the previous embodiment, and details will not be repeated here.

Another embodiment of the present disclosure provides a timing information configuration apparatus. The apparatus includes a processor and a computer-readable storage medium. The computer-readable storage medium stores an instruction. When the instruction is executed by the processor, any timing information configuration method described above is implemented.

Another embodiment of the present disclosure provides a computer-readable storage medium. The computer-readable storage medium stores a computer program which, when executed by a processor, implements steps of any timing information configuration method described above.

Figure 7:
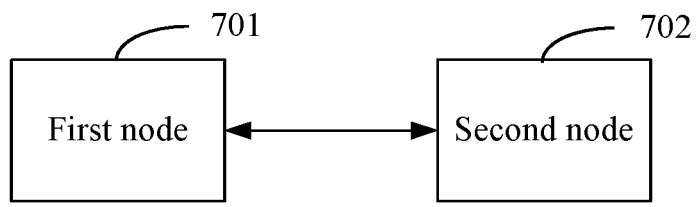
FIG. 7 is a structure diagram of a timing information configuration system according to another embodiment of the present disclosure.

Referring to FIG. 7, another embodiment of the present disclosure provides a timing information configuration system. The system includes a first node 701 and a second node 702.

The first node 701 is configured to predefine or configure timing information of the second node.

The second node 702 is configured to determine timing information of the second node in a manner of predefinition or in a manner of being configured.

The timing information includes at least one of: a timing mode, a reference timing alignment mode, a TA configuration mode, a TA value, an offset of a TA value, a number of OFDM symbols that an uplink transmission link is advanced or delayed relative to a downlink transmission link for alignment, or a number of OFDM symbols that an uplink reception link is advanced or delayed relative to a downlink reception link for alignment.

In the embodiment of the present disclosure, the timing mode includes at least one of a first timing mode, a second timing mode, a third timing mode, or a hybrid timing mode.

In the embodiment of the present disclosure, the first timing mode includes that a reference timing of each node is aligned with a reference timing of a donor node.

The second timing mode includes that a reference timing of each node is aligned with a reference timing of a donor node and that an uplink transmission timing of the each node is aligned with the reference timing of the each node.

The third timing mode includes that a reference timing of each node is aligned with a reference timing of a donor node and that an uplink reception timing of the each node is aligned with a downlink reception timing of the each node.

In the embodiment of the present disclosure, the hybrid timing mode includes at least one of the modes described below.

A timing mode of the second node in a first slot is the second timing mode and a timing mode of the second node in a second slot is the third timing mode; where a remainder obtained after a slot index of the first slot is divided by 2 is a first value, a remainder obtained after a slot index of the second slot is divided by 2 is a second value, and the first value and the second value are different and are each either 0 or 1.

A timing mode of the second node in a third slot is the first timing mode, a timing mode of the second node in a fourth slot is the second timing mode, and a timing mode of the second node in a fifth slot is the third timing mode; where a remainder obtained after a slot index of the third slot is divided by 3 is a third value, a remainder obtained after a slot index of the fourth slot is divided by 3 is a fourth value, a remainder obtained after a slot index of the fifth slot is divided by 3 is a fifth value, and the third value, the fourth value, and the fifth value are different and are each any one of 0, 1, or 2.

A timing mode of simultaneous transmission and a timing mode of simultaneous reception are simultaneously supported.

In the embodiment of the present disclosure, the first node 701 is specifically configured to implement predefinition of the timing mode of the second node in the manner described below.

Any one of the first timing mode, the second timing mode, the third timing node, or the hybrid timing mode is predefined as the timing mode of the second node.

The second node 702 is specifically configured to determine the timing mode of the second node in the manner of predefinition in the manner described below.

Any one of the first timing mode, the second timing mode, the third timing node, or the hybrid timing mode is predefined as the timing mode of the second node.

In the embodiment of the present disclosure, the first node 701 and the second node 702 are specifically configured to implement predefinition of the timing mode of the second node in at least one of the manners described below.

In a case where a time division multiplexing manner is adopted for all hop links including a link between a first node and the second node, the first timing mode is predefined as the timing mode of the second node.

In a case where a spatial division multiplexing manner or a frequency division multiplexing manner is adopted for all hop links including a link between a first node and the second node and a simultaneous transmission mechanism is adopted for an uplink transmission of the second node and a downlink transmission of the second node, the second timing mode is predefined as the timing mode of the second node.

In a case where a spatial division multiplexing manner or a frequency division multiplexing manner is adopted for all hop links including a link between a first node and the second node and a simultaneous reception mechanism is adopted for an uplink reception of the second node and a downlink reception of the second node, the third timing mode is predefined as the timing mode of the second node.

In the embodiment of the present disclosure, the first node 701 and the second node 702 are specifically configured to implement predefinition of the timing mode of the second node in at least one of the manners described below.

The first timing mode is predefined as a timing mode of the second node within a first time resource.

The second timing mode is predefined as a timing mode of the second node within a second time resource.

The third timing mode is predefined as a timing mode of the second node within a third time resource.

In the embodiment of the present disclosure, the first time resource is a slot corresponding to a third value which is a remainder obtained after a slot index is divided by 3.

The second time resource is a slot corresponding to a fourth value which is a remainder obtained after a slot index is divided by 3.

The third time resource is a slot corresponding to a fifth value which is a remainder obtained after a slot index is divided by 3.

The third value, the fourth value, and the fifth value are different and are each any one of 0, 1, or 2.

In the embodiment of the present disclosure, the first node 701 is specifically configured to implement configuration of the timing mode of the second node in the manner described below.

The first node configures the timing mode of the second node according to a timing mode capability reported by the second node.

The second node 702 is further configured to report the timing mode capability of the second node.

In the embodiment of the present disclosure, the first node 701 is specifically configured to implement configuration of the timing mode of the second node according to the timing mode capability reported by the second node in at least one of the manners described below.

In a case where the timing mode capability reported by the second node is that the second node has a first capability, the second timing mode is configured as the timing mode of the second node; where the first capability includes any one of the following: the second node supports the second timing mode; or the second node has a capability of simultaneous transmission of an uplink transmission and a downlink transmission.

In a case where the timing mode capability reported by the second node is that the second node does not have a first capability, the first timing mode or the third timing mode is configured as the timing mode of the second node.

In a case where the timing mode capability reported by the second node is that the second node has a second capability, the third timing mode is configured as the timing mode of the second node; where the second capability includes any one of the following: the second node supports the third timing mode; or the second node has a capability of simultaneous reception of an uplink reception and a downlink reception.

In a case where the timing mode capability reported by the second node is that the second node does not have a second capability, the first timing mode or the second timing mode is configured as the timing mode of the second node.

In a case where the timing mode capability reported by the second node is that the second node has a third capability, the hybrid timing mode is configured as the timing mode of the second node; where the third capability includes any one of the following: the second node supports the hybrid timing mode; or the second node supports a timing mode of simultaneous transmission of an uplink transmission and a downlink transmission and a timing mode of simultaneous reception of an uplink reception and a downlink reception.

In a case where the timing mode capability reported by the second node is that the second node does not have a third capability, the first timing mode is configured as the timing mode of the second node.

In the embodiment of the present disclosure, the first node 701 is specifically configured to implement configuration of the timing mode of the second node in the manner described below.

The first node configures the timing mode of the second node in a manner of first signaling.

Alternatively, the first node configures the timing mode of the second node in a manner of OAM.

The second node 702 is specifically configured to determine the timing mode of the second node in the manner of being configured in the manner described below.

First signaling is received and the timing mode of the second node is determined according to the first signaling.

Alternatively, the timing mode of the second node is determined in the manner of OAM.

In the embodiment of the present disclosure, the first signaling includes wireless air interface signaling, and the wireless air interface signaling includes at least one of: higher-layer signaling, media access control (MAC) signaling, or physical layer signaling.

In the embodiment of the present disclosure, the first signaling includes wireless air interface signaling, and the wireless air interface signaling includes at least one of: higher-layer signaling, media access control (MAC) signaling, or physical layer signaling.

In the embodiment of the present disclosure, any one of the first timing mode, the second timing mode, the third timing mode, or the hybrid timing mode is represented by any X binary states among $2^A$ binary states represented by A bits in the first signaling; where A and X are each an integer greater than or equal to 1.

In the embodiment of the present disclosure, the reference timing alignment mode is a reference timing alignment mode in a case where the timing mode is the second timing mode.

In the embodiment of the present disclosure, the reference timing alignment mode includes at least one of: a first reference timing alignment mode, a second reference timing alignment mode, or a hybrid reference timing alignment mode.

In the embodiment of the present disclosure, the first reference timing alignment mode includes at least one of: in a case where the first timing mode and the second timing mode are performed in parallel, determining a reference timing between nodes according to a reference timing of the first timing mode; or in a case where the third timing mode and the second timing mode are performed in parallel, determining a reference timing between nodes according to a reference timing of the third timing mode.

The second reference timing alignment mode includes determining a reference timing between nodes according to a time difference between a reference timing of the first node and an uplink reception timing and a time difference between a reference timing of the second node and a downlink reception timing.

In the embodiment of the present disclosure, the hybrid reference timing alignment mode includes: adopting the first reference timing alignment mode from a first reference timing alignment to an N-th reference timing alignment, and adopting the second reference timing alignment mode after the N-th reference timing alignment; where N is an integer greater than or equal to 1.

In the embodiment of the present disclosure, the first node 701 is specifically configured to implement predefinition of the reference timing alignment mode of the second node in the manner described below.

Any one of the first reference timing alignment mode, the second reference timing alignment mode, or the hybrid reference timing alignment mode is predefined as the reference timing alignment mode of the second node.

The second node 702 is specifically configured to determine the reference timing alignment mode of the second node in the manner of predefinition in the manner described below.

Any one of the first reference timing alignment mode, the second reference timing alignment mode, or the hybrid reference timing alignment mode is predefined as the reference timing alignment mode of the second node.

In the embodiment of the present disclosure, the first node 701 is specifically configured to implement configuration of the reference timing alignment mode of the second node in the manner described below.

The reference timing alignment mode of the second node is configured in a manner of second signaling.

Alternatively, the reference timing alignment mode of the second node is configured in the manner of OAM.

The second node 702 is specifically configured to determine the reference timing alignment mode of the second node in the manner of being configured in the manner described below.

Second signaling is received and the reference timing alignment mode of the second node is determined according to the second signaling.

Alternatively, the reference timing alignment mode of the second node is determined in a manner of OAM.

In the embodiment of the present disclosure, the second signaling includes wireless air interface signaling, and the wireless air interface signaling includes at least one of: higher-layer signaling, media access control (MAC) signaling, or physical layer signaling.

In the embodiment of the present disclosure, any one of the first reference timing alignment mode, the second reference timing alignment mode, or the hybrid reference timing alignment mode is represented by any Y binary states among $2^B$ binary states represented by B bits in the second signaling; where B and Y are each an integer greater than or equal to 1.

In the embodiment of the present disclosure, the first node 701 is specifically configured to implement configuration of the reference timing alignment mode of the second node in the manner described below.

The first node configures the reference timing alignment mode of the second node according to a reference timing alignment mode capability reported by the second node.

The second node 702 is further configured to report the reference timing alignment mode capability of the second node.

In the embodiment of the present disclosure, the first node 701 is specifically configured to implement configuration of the reference timing alignment mode of the second node according to the reference timing alignment mode capability reported by the second node in at least one of the manners described below.

In a case where the reference timing alignment mode capability reported by the second node is that the second node does not support the first timing mode or the third timing mode, the second reference timing alignment mode is configured as the reference timing alignment mode of the second node.

In a case where the reference timing alignment mode capability reported by the second node is that the second node supports the first timing mode or the third timing mode, the first reference timing alignment mode is configured as the reference timing alignment mode of the second node.

In the embodiment of the present disclosure, the TA configuration mode is a TA configuration mode in a case where the timing mode is the third timing mode.

In the embodiment of the present disclosure, the TA configuration mode includes at least one of a first TA configuration mode, a second TA configuration mode, a third TA configuration mode, or a compatibility mode.

In the embodiment of the present disclosure, the first TA configuration mode includes configuring an absolute negative TA.

The second TA configuration mode includes configuring a relative negative TA.

The third TA configuration mode includes a symbol alignment for positive TA.

In the embodiment of the present disclosure, the compatibility mode includes that the first node configures a positive TA and that the first node schedules the second node in a non-slot manner.

In the embodiment of the present disclosure, the first node 701 and the second node 702 are specifically configured to implement predefinition of the TA configuration mode in the manner described below.

Any one of the first TA configuration mode, the second TA configuration mode, the third TA configuration mode, or the compatibility mode is predefined as the TA configuration mode.

In the embodiment of the present disclosure, the first node 701 is specifically configured to implement configuration of the TA configuration mode of the second node in the manner described below.

The TA configuration mode of the second node is configured in a manner of third signaling.

Alternatively, the TA configuration mode of the second node is configured in a manner of OAM.

The second node 702 is specifically configured to determine the TA configuration mode of the second node in the manner of being configured in the manner described below.

Third signaling is received and the TA configuration mode of the second node is determined according to the third signaling.

Alternatively, the TA configuration mode of the second node is determined in a manner of OAM.

In the embodiment of the present disclosure, the third signaling includes wireless air interface signaling, and the wireless air interface signaling includes at least one of: higher-layer signaling, media access control (MAC) signaling, or physical layer signaling.

In the embodiment of the present disclosure, any one of the first TA configuration mode, the second TA configuration mode, the third TA configuration mode, or the compatibility mode is represented by any Z binary states among $2^C$ binary states represented by C bits in the third signaling; where C and Z are each an integer greater than or equal to 1.

In the embodiment of the present disclosure, the first node 701 is specifically configured to implement configuration of the TA configuration mode of the second node in the manner described below.

The TA configuration mode of the second node is configured according to a TA configuration mode capability reported by the second node.

The second node 702 is further configured to report the TA configuration mode capability of the second node.

In the embodiment of the present disclosure, the first node 701 is specifically configured to implement configuration of the TA configuration mode of the second node according to the TA configuration mode capability reported by the second node in at least one of the manners described below.

In a case where the TA configuration mode capability reported by the second node is that the second node does not have a negative TA capability, the third TA configuration mode or the compatibility mode is configured as the TA configuration mode of the second node.

In a case where the TA configuration mode capability reported by the second node is that the second node has a negative TA capability, the first TA configuration mode or the second TA configuration mode is configured as the TA configuration mode of the second node.

In the embodiment of the present disclosure, the TA value is an absolute TA value, the TA value being greater than zero indicates that an uplink transmission timing of the second node is advanced relative to a downlink reception timing of the second node, the TA value being less than zero indicates that the uplink transmission timing of the second node is delayed relative to the downlink reception timing of the second node, and the TA value being equal to zero indicates that the uplink transmission timing of the second node is aligned with the downlink reception timing of the second node.

In the embodiment of the present disclosure, the step of determining the TA value includes at least one of the cases described below.

In a case where the timing mode is the first timing mode, it is determined that an attribute of a TA value of a 0-th hop link is equal to 0.

In a case where the timing mode is the first timing mode, it is determined that an attribute of a TA value of an i-th hop link is greater than or equal to 0, and the TA value of the i-th hop link is 2PD(i); where PD(i) is the propagation delay of the i-th hop link.

In a case where the timing mode is the second timing mode, it is determined that an attribute of a TA value of a 0-th hop link is equal to 0.

In a case where the timing mode is the second timing mode, it is determined that an attribute of a TA value of an i-th hop link is greater than or equal to 0, and the TA value of the i-th hop link is PD(i); where PD(i) is the propagation delay of the i-th hop link.

In a case where the timing mode is the third timing mode, it is determined that an attribute of a TA value of a 0-th hop link is equal to 0.

In a case where the timing mode is the third timing mode, it is determined that an attribute of a TA value of a first hop link is greater than or equal to 0, and the TA value of the i-th hop link is 2PD(i); where PD(i) is the propagation delay of the i-th hop link.

In a case where the timing mode is the third timing mode and PD(i−1) is less than or equal to 2PD(i), it is determined that an attribute of a TA value of an i-th hop link is greater than or equal to 0, and the TA value of the i-th hop link is 2PD(i)−PD(i−1); where PD(i) is the propagation delay of the i-th hop link.

In a case where the timing mode is the third timing mode and PD(i−1) is greater than or equal to 2PD(i), it is determined that an attribute of a TA value of an i-th hop link is less than or equal to 0, and the TA value of the i-th hop link is −(PD(i−1)−2PD(i)).

In the embodiment of the present disclosure, the first node 701 is specifically configured to implement configuration of the TA value of the second node in a following manner: the TA value of the second node is configured through indication information bits.

The second node 702 is specifically configured to determine the TA value of the second node in the manner of being configured in the manner described below.

Indication information bits are received and the TA value of the second node is determined according to the indication information bits.

Alternatively, an attribute of the TA value is determined according to a bit interval corresponding to the configured TA value.

Alternatively, an attribute of the TA value is determined according to the timing mode and the propagation delay of a hop link.

In the embodiment of the present disclosure, the indication information bits comprise (D+1) bits, where D bits indicate a numerical value of the TA value and 1 bit indicates an attribute of the TA value; where D is an integer greater than or equal to 1.

In the embodiment of the present disclosure, the second node 702 is specifically configured to implement determination of the attribute of the TA value according to the bit interval corresponding to the configured TA value in at least one of the manners described below.

In a case where a bit interval corresponding to the TA value is a first sub-interval, it is determined that an attribute of the TA value is greater than or equal to 0.

In a case where a bit interval corresponding to the TA value is a second sub-interval, it is determined that an attribute of the TA value is less than or equal to 0.

An union of the first sub-interval and the second sub-interval is a TA value interval in a timing advance command (TAC).

In the embodiment of the present disclosure, the offset of the TA value is an offset relative to a TA value at a specific time, the value of (TA+Offset)being greater than zero indicates that an uplink transmission timing of the second node is advanced relative to a downlink reception timing of the second node, the value of (TA+Offset) being less than zero indicates that the uplink transmission timing of the second node is delayed relative to the downlink reception timing of the second node, and the value of (TA+Offset)being equal to zero indicates that the uplink transmission timing of the second node is aligned with the downlink reception timing of the second node, where Offset is the offset of the TA value.

In the embodiment of the present disclosure, a time granularity corresponding to the Offset is different from a time granularity corresponding to the TA value.

In the embodiment of the present disclosure, the offset of the TA value is an offset relative to a latest TA value.

The offset is independent of a TAC in a random access response (RAR) or independent of a TAC in a media access control control element (MAC CE); or the offset has a nested relationship with a TAC in an RAR or a TAC in a MAC CE.

In the embodiment of the present disclosure, the offset having the nested relationship with the TAC in the RAR or the TAC in the MAC CE includes extending a TA value interval in the TAC in the MAC CE or in the TAC in the RAR into a union of a third sub-interval and a fourth sub-interval; where the third sub-interval indicates a TA value in the TAC in the MAC CE or in the TAC in the RAR, and the fourth sub-interval indicates the offset of the TA value.

In the embodiment of the present disclosure, the first node 701 is specifically configured to implement configuration of the offset of the TA value of the second node in the manner described below.

The offset of the TA value of the second node is configured in a manner of fourth signaling. The fourth signaling includes wireless air interface signaling, and the wireless air interface signaling includes at least one of: higher-layer signaling, media access control (MAC) signaling, or physical layer signaling.

Alternatively, the offset of the TA value of the second node is configured in the manner of OAM.

The second node 702 is specifically configured to determine the offset of the TA value of the second node in the manner of being configured in the manner described below.

Fourth signaling is received, and the offset of the TA value of the second node is determined according to the fourth signaling.

Alternatively, the offset of the TA value of the second node is determined in a manner of OAM.

In the embodiment of the present disclosure, a time length of OFDM symbols is determined according to any one of: min (SCS_UL_Tx, SCS_DL_Tx)or min (SCS_UL_Rx, SCS_DL_Rx).

SCS_UL_Tx is subcarrier spacing corresponding to an uplink transmission link of the second node, SC_S_DL_Tx is subcarrier spacing corresponding to a downlink transmission link of the second node, SCS_UL_Rx is subcarrier spacing corresponding to an uplink reception link of the second node, and SCS_DL_Rx is subcarrier spacing corresponding to a downlink reception link of the second node.

The specific implementation process of the timing information configuration system described above is the same as the specific implementation process of the timing information configuration method described in the previous embodiment, and details will not be repeated here.

It is to be understood by those of ordinary skill in the art that functional modules/units in all or part of the steps of the method, the system and the apparatus disclosed above may be implemented as software, firmware, hardware and appropriate combinations thereof. In the hardware implementation, the division of the preceding function modules/units may not correspond to the division of physical components. For example, one physical component may have multiple functions, or one function or step may be performed jointly by several physical components. Some or all components may be implemented as software executed by a processor such as a digital signal processor or a microprocessor, may be implemented as hardware, or may be implemented as integrated circuits such as application-specific integrated circuits. Such software may be distributed over computer-readable media. The computer-readable media may include computer storage media (or non-transitory media) and communication media (or transitory media). As is known to those having ordinary skill in the art, the term computer storage media include volatile and non-volatile as well as removable and non-removable media implemented in any method or technology for storing information (such as computer-readable instructions, data structures, program modules or other data). The computer-storage media include, but are not limited to, a random access memory (RAM), a read-only memory (ROM), an electrically erasable programmable read-only memory (EEPROM), a flash memory, or other memory technologies, a compact disc read only memory (CD-ROM), a digital video disk (DVD) or other optical disc storage, a magnetic cassette, a magnetic tape, disk storage or other magnetic storage apparatuses, or any other media used to store the desired information and accessible by a computer. Moreover, as is known to those having ordinary skill in the art, communication media generally include computer-readable instructions, data structures, program modules or other data in carriers or in modulated data signals transported in other transport mechanisms and may include any information delivery medium.

What is claimed is:

1. A timing information configuration method, comprising:
   configuring, by a parent node, a timing mode of an integrated access and backhaul (IAB) node in a slot by media access control (MAC) signaling;
   wherein the timing mode comprises:
   a first timing mode, wherein the first timing mode comprises that a downlink transmission timing of the IAB node is aligned with a downlink transmission timing of the parent node;
   a second timing mode, wherein the second timing mode comprises that a downlink transmission timing of the IAB node is aligned with a downlink transmission timing of the parent node and an uplink transmission timing of the IAB node is aligned with the downlink transmission timing of the IAB node; and
   a third timing mode, wherein the third timing mode comprises that a downlink transmission timing of the IAB node is aligned with a downlink transmission timing of the parent node and an uplink reception timing of the parent node is aligned with a downlink reception timing of the parent node;
   wherein in the MAC signaling, any one of the first timing mode, the second timing mode, or the third timing mode is represented by any three binary states among four binary states represented by two bits.

2. A timing information configuration apparatus, comprising a processor and a computer-readable storage medium, wherein the computer-readable storage medium stores an instruction, and the instruction is configured to, when executed by the processor, implement the method of claim 1.

3. A non-transitory computer-readable storage medium, which is configured to store a computer program, and the computer program is configured to, when executed by a processor, implement the method of claim 1.

4. A timing information configuration method, comprising:
   determining, by an integrated access and backhaul (IAB) node, a timing mode in a slot in a manner of being configured by a parent node by media access control (MAC) signaling;
   wherein the timing mode comprises:
   a first timing mode, wherein the first timing mode comprises that a downlink transmission timing of the IAB node is aligned with a downlink transmission timing of the parent node;
   a second timing mode, wherein the second timing mode comprises that a downlink transmission timing of the IAB node is aligned with a downlink transmission timing of the parent node and an uplink transmission timing of the IAB node is aligned with the downlink transmission timing of the IAB node; and
   a third timing mode, wherein the third timing mode comprises that a downlink transmission timing of the IAB node is aligned with a downlink transmission timing of the parent node and an uplink reception timing of the parent node is aligned with a downlink reception timing of the parent node;
   wherein in the MAC signaling, any one of the first timing mode, the second timing mode, or the third timing mode is represented by any three binary states among four binary states represented by two bits.

5. A timing information configuration apparatus, comprising a processor and a computer-readable storage medium, wherein the computer-readable storage medium stores an instruction, and the instruction is configured to, when executed by the processor, implement the method of claim 4.

6. A non-transitory computer-readable storage medium, which is configured to store a computer program, and the computer program is configured to, when executed by a processor, implement the method of claim 4.

7. A timing information configuration system, comprising:
- a parent node, which is configured to configure a timing mode of an integrated access and backhaul (IAB) node in a slot by media access control (MAC) signaling; and
- an integrated access and backhaul (IAB) node, which is configured to determine a timing mode in a manner of being configured by a parent node by media access control (MAC) signaling;

wherein the timing mode comprises:
- a first timing mode, wherein the first timing mode comprises that a downlink transmission timing of the IAB node is aligned with a downlink transmission timing of the parent node;
- a second timing mode, wherein the second timing mode comprises that a downlink transmission timing of the IAB node is aligned with a downlink transmission timing of the parent node and an uplink transmission timing of the IAB node is aligned with the downlink transmission timing of the IAB node; and
- a third timing mode, wherein the third timing mode comprises that a downlink transmission timing of the IAB node is aligned with a downlink transmission timing of the parent node and an uplink reception timing of the parent node is aligned with a downlink reception timing of the parent node;
wherein in the MAC signaling, any one of the first timing mode, the second timing mode, or the third timing mode is represented by any three binary states among four binary states represented by two bits.

* * * * *